United States Patent
Maeng et al.

(10) Patent No.: US 6,654,613 B1
(45) Date of Patent: Nov. 25, 2003

(54) DEVICE AND METHOD OF CONTINUOUS OUTER-LOOP POWER CONTROL IN DTX MODE FOR CDMA MOBILE COMMUNICATION SYSTEM

(75) Inventors: Seung-Joo Maeng, Songnam-shi (KR); Jae-Heung Yeom, Seoul (KR); Jae-Min Ahn, Seoul (KR); Young Ky Kim, Seoul (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 09/503,763

(22) Filed: Feb. 14, 2000

(30) Foreign Application Priority Data

Feb. 13, 1999 (KR) .......................................... 1999-5300

(51) Int. Cl.[7] .............................................. H04B 7/185
(52) U.S. Cl. ........................... 455/522; 455/69; 455/70; 370/335; 370/342; 370/347
(58) Field of Search .......................... 455/69, 522, 13.4, 455/70, 422, 115, 67.1; 370/335, 318

(56) References Cited

U.S. PATENT DOCUMENTS

| | | | | |
|---|---|---|---|---|
| 5,574,984 A | * | 11/1996 | Reed et al. | 455/69 |
| 5,713,074 A | * | 1/1998 | Hulbert | 455/69 |
| 5,946,346 A | * | 8/1999 | Ahmed | 375/219 |
| 6,070,085 A | * | 5/2000 | Bender et al. | 455/522 |
| 6,075,974 A | * | 6/2000 | Saints | 455/69 |
| 6,134,226 A | * | 10/2000 | Reed et al. | 370/328 |
| 6,259,928 B1 | * | 7/2001 | Vembu | 455/522 |
| 6,347,080 B2 | * | 2/2002 | Jou et al. | 370/310 |
| 6,418,137 B1 | * | 7/2002 | Bontu et al. | 370/347 |
| 6,449,463 B1 | * | 9/2002 | Schiff | 455/69 |
| 6,539,008 B1 | * | 3/2003 | Ahn et al. | 370/342 |

FOREIGN PATENT DOCUMENTS

| | | |
|---|---|---|
| JP | 11-041203 | 2/1999 |
| WO | WO 97/50197 | 12/1997 |

OTHER PUBLICATIONS

Japanese Office Action dated Apr. 22, 2003, issued in a counterpart application, namely, Appln. No. 2000-599154.

* cited by examiner

*Primary Examiner*—Lee Nguyen
*Assistant Examiner*—Khawar Iqbal
(74) *Attorney, Agent, or Firm*—Dilworth & Barrese, LLP

(57) ABSTRACT

A device and method for outer-loop power control in a discontinuous transmission mode in a CDMA mobile communication system. In an outer-loop power control method for a non-frame data transmission period of a dedicated control channel (DCCH) which transmits frame data discontinuously, the signal-to-noise ratio (SNR) of power control bits (PCBs) received at a mobile station from a base station is measured for the frame period, and it is determined whether the frame has errors based on the measured SNR. A closed-loop power control threshold is increased if a frame error exists and decreased if no frame errors exist.

27 Claims, 21 Drawing Sheets

US 6,654,613 B1

DEVICE AND METHOD OF CONTINUOUS OUTER-LOOP POWER CONTROL IN DTX MODE FOR CDMA MOBILE COMMUNICATION SYSTEM

BACKGROUND OF THE INVENTION

1. Field of the Invention

The present invention relates generally to a device and method of continuous outer-loop power control in a discontinuous transmission (DTX) mode for a CDMA (Code Division Multiple Access) mobile communication system, and in particular, to a device and method for implementing an outer-loop power control in a non-frame data transmission period as well as a frame data transmission period.

2. Description of the Related Art

For packet transmission in the American IMT-2000 standard, IS-95C, P1, P2, and P3 options are used. The P1, P2, and P3 options utilize a fundamental traffic channel & a supplemental channel, a fundamental traffic channel & a dedicated control channel (DCCH), and a fundamental traffic channel, a DCCH, & a supplemental channel, respectively. Control information about a packet and a signaling message are transmitted on the fundamental traffic channel and the DCCH and packet data is transmitted on the supplemental channel. The control information and the signaling message do not occur all the time. When no control information and signaling message exist, the fundamental traffic channel transmits null traffic, whereas the DCCH transmits power control bits (PCBs) on a forward link and pilot symbols & PCBs on a reverse link. The mode of the DCCH is termed a DTX mode during which only null frames are transmitted when there is no transmission frame data. The fundamental traffic channel and dedicated control channel (DCCH) are dedicated channels. In other words, it is also a dedicated channel that the channel is assigned to a specific user in traffic period.

For power control, an outer-loop power control and a closed-loop power control are concurrently performed in the DTX mode. The closed-loop power control refers to controlling power for each power control group (PCG), using a threshold determined for each frame. On the other hand, the outer-loop power control scheme changes the threshold set for the closed-loop power control depending on the presence or absence of frame errors. Specifically, the threshold is increased or decreased by a predetermined level according to whether a frame has errors or not. Then, a closed-loop power controller implements a closed-loop power control using the changed threshold. In the case that the outer-loop power control and the closed-loop power control are employed together, the closed-loop power control is implemented using a threshold determined by the outer-loop power control upon presence of a frame and an existing threshold upon absence of a frame, in a DTX mode.

A description of power control in a DTX mode for a communication system employing both the outer-loop power control scheme and closed-loop power control scheme is provided below.

FIG. 1A is a block diagram of a forward link transmitter in a general CDMA mobile communication system. Referring to FIG. 1, insertion of PCBs in a DTX mode will be described.

In FIG. 1, a control message buffer 111 is a memory for temporarily storing a control message to be transmitted on a DCCH. The capacity of the control message buffer 111 can be set to one or more frames. The control message buffer 111 interfaces a control message between a higher-layer processor and a MODEM controller 113. The higher-layer processor stores a control message with header information for identifying a frame according to a message type in the control message buffer 111 and sets a flag to indicate the storage. The MODEM controller 113 reads the control message from the control message buffer 111 and then clears a flag to indicate the reading. By the operations, the higher-layer processor and the MODEM controller 113 prevent over-writing and over-reading.

After reading the control message from the control message buffer 111, the MODEM controller 113 determines a message type by analyzing the header of the control message, and outputs a payload to be transmitted on a DCCH according to the message type and a corresponding control signal. The output control message is variable in duration, that is, 5 or 20 ms according to the analysis result. In the following description, no distinction is made between a 5 ms-control message and a 20 ms-control message. The MODEM controller 113 determines whether there is a control message to transmit and controls transmission of the DCCH. That is, the MODEM controller 113 generates a first gain control signal upon presence of a control message to be transmitted and a second gain control signal for blocking signal transmission on the DCCH upon absence of a control message. The gain control signals are signals for controlling the transmission power of the DCCH. While the multiplier 125 is located at the frontal end of a spreader, the same effect can be produced even if it is at the rear end of the spreader.

A CRC (Cyclic Redundancy Check) generator 115 adds a CRC to the control message received from the MODEM controller 113 to allow a receiver to determine the quality of a frame, that is, the presence or absence of a frame. The CRC generator 115 outputs a control message with the CRC under the control of the MODEM controller 113. A 40-bit control message with a 16-bit CRC is generated for a 5 ms-frame, and a 184-bit control message with a 12-bit CRC for. a 20 ms-frame.

A tail bit encoder 117 analyzes the output of the CRC generator 115 and adds corresponding tail bits to the output of the CRC generator 115, for terminating an error correction code. Here, the tail bit encoder 117 generates 8 tail bits.

An encoder 119 encodes the output of the tail bit encoder 117 at a code rate of ⅓. The encoder 119 can be a convolutional encoder or a turbo encoder. An interleaver 121 permutes the bit sequence of encoded symbols received from the encoder 119 in frame units to protect the data from burst errors.

The CRC generator 115, the tail bit encoder 117, the encoder 119, and the interleaver 121 form a control message generator 150 for generating a control message and transmitting it on a physical channel. While the control message generator 150 processes a control message for a frame in FIG. 1A, it can be contemplated that the MODEM controller 113 selects a control message generator corresponding to the length of a frame to transmit among as many control message generators as the frame lengths of control messages transmitted on the DCCH. In this case, each control message generator should be provided with a CRC generator, a tail bit encoder, an encoder, and an interleaver according to the frame length of a control message processed in the control message generator.

A signal mapper 123 maps 1s and 0s of the interleaved symbols to −1s and 1s, respectively. A gain multiplier 125 performs a DTX mode function by establishing a path for transmitting the DCCH control message or blocking the path depending on which gain control message is received from the MODEM controller 113.

A PCB puncturer 129 inserts a PCB into a signal received from the multiplier 125. A serial-to-parallel converter (SPC) 127 multiplexes control message symbols received from the PCB puncturer 129 and distributes the multiplexed symbols to carrier spreaders. Here, three carriers are used by way of example. For the three carriers, six channels are produced from three carrier frequencies and two phases (I and Q channels) of each carrier. The PCB can be used for controlling reverse link power of a mobile station.

FIG. 1B is a block diagram of a spreader for spreading symbols received from the PCB puncturer 129. A forward link transmitter includes as many spreaders as carriers. For example, three spreaders exist in the forward link transmitter shown in FIG. 1A.

Referring to FIG. 1B, an orthogonal code generator 135 generates a DCCH orthogonal code which can be a Walsh code or a quasi-orthogonal code. Multipliers 131 and 133 multiply I- and Q-channel signals of the forward DCCH control message by the orthogonal code, for orthogonal spreading.

A modulator 137 PN-spreads the orthogonally spread I- and Q-channel signals received from the multipliers 131 and 133 with PN codes PNi and PNq received from a PN sequence generator (not shown). A complex multiplier can be used as the modulator 137.

The MODEM controller 113 controls transmission of the DCCH in a DTX mode. That is, the MODEM controller 113 performs a DTX mode control according to the capacities of signals for data service and MAC-related messages (Medium Access Control) communicated on the DCCH, to thereby use channel capacity efficiently. Since voice traffic and signal traffic are multiplexed in IS-95, both a voice channel and a signaling channel are typically opened all the time for data service. However, the DCCH operates in the DTX mode and thus need not be opened for a control signal. If no signaling information is to be transmitted, a DTX gain controller like the MODEM controller 113 reduces transmission power for efficient use of radio resources.

The above embodiment is about a 3x system using a multi-carrier and can be applied to a transmitter in a 1x or 3x DS system (Direct Sequence). Thus, a description of the 1x or 3x DS system will be omitted.

FIG. 2 is a block diagram of a reverse link transmitter which operates in a DTX mode for a conventional CDMA mobile communication system. As shown in FIG. 2, the reverse link transmitter is similar to the forward link transmitter in structure. Therefore, a description of the same components will be omitted.

An orthogonal spreader 207 generates a Walsh code. A first multiplier 209 multiplies a transmission signal received from a signal mapper 205 by the Walsh code received from the orthogonal spreader 207, for orthogonal spreading. A gain multiplier 221 outputs a gain value for a message, or outputs no data upon receipt via gain controller 219 of a gain control signal 0 from a MODEM controller 203 if there is no transmission message and data upon receipt of a gain control signal 1 from the MODEM controller 203 if a transmission message exists. A summing device 223 forms a DCCH signal by summing the transmission signal received from the gain multiplier 221 and a pilot/PCB channel signal. A PN spreader 225 complex-PN-spreads the DCCH signal.

A description of the structures and operations of forward and reverse link receivers for performing an outer-loop power control and a closed-loop power control using a reverse pilot channel and a PCB received on a forward DCCH follows with reference to FIGS. 3 and 4, respectively.

FIG. 3 is a block diagram of a reverse link receiver in a DTX mode for a conventional CDMA mobile communication system.

Referring to FIG. 3, a first despreader 301 is a PN despreader for PN-despreading a received signal. A second despreader 303 is a DCCH Walsh despreader for despreading a DCCH signal included in the PN-despread signal received from the first despreader 301 with a Walsh code. A channel estimator 305 detects a fading component using a pilot channel included in the PN-despread signal received from the first despreader 301. A third despreader 307 is a pilot channel Walsh despreader for despreading the pilot channel signal included in the PN-despread signal received from the first despreader 301 with a Walsh code.

A multiplier 314 multiplies the complex conjugate of the fading component received from the channel estimator 305 by the DCCH signal received from the second despreader 303 in symbol units, for error compensation. A PCB extractor 317 extracts a PCB from the error-compensated DCCH signal received from the multiplier 314. A bit energy measurer 309 measures bit energy Eb from the PCB received from the PCB extractor 317 and the fading component received from the channel estimator 305. A noise measurer 311 measures noise energy Nt from the symbol value of the pilot channel received from the third despreader 307 and the fading component from the channel estimator 305. An SNR calculator 313 calculates an SNR from the noise energy Nt and the bit energy Eb. For details of an Eb and Nt measuring method, see "Forward Link Closed Loop Power Control Method for CDMA 2000-(Rev. 1)", Stein Lundby, Contribution to TR45.5.3.1./98.12.08.28.

A decoder 319 decodes the output of the PCB extractor 317 and a CRC error detector 321 performs a CRC error check on the decoded signal received from the decoder 319. The output of the CRC error detector 321 is True (1) or False (0). Since the DCCH channel is transmitted in the DTX mode, the receiver calculates a CRC from a frame if the frame has transmission data to determine whether a frame error has occurred. For details of a method of determining whether a DCCH has frame data or not in a DTX mode, see Korea Application No. 98-04498. A data detector 323 receives frame data and a CRC error check result from the CRC error detector 321 and generates an on/off control signal to a MODEM controller 325. The MODEM controller 325 is activated by the on/off control signal to detect a control message from the decoded data received from the decoder 319 and to store the control message in a control message buffer 327.

If the receiver performs a closed-loop power control alone, a closed-loop power controller 315 compares the SNR of each PCB received from the SNR calculator 313 with a fixed threshold and controls power according to the result of the comparison. If the receiver performs a closed-loop power control and an outer-loop power control together, an outer-loop power controller 329 is further provided to the receiver. The outer-loop power controller 329 determines a threshold and then the closed-loop power controller 315 performs a closed-loop power control using the threshold. The outer-loop power controller 329 is activated upon receipt of a frame existence flag from the data detector 323 and determines the threshold from the CRC check result received from the CRC error detector 321.

Referring to FIG. 6, a closed-loop power control method in the above reverse link receiver will be described. In step 601, the SNR calculator 313 calculates an SNR from Nt and Eb measured by the noise measurer 311 and the bit energy measurer 309, respectively. Upon receipt of the SNR from the SNR calculator 313, the closed-loop power controller 315 compares the SNR with a fixed threshold in step 603. If the SNR is greater than the threshold, the closed-loop power controller 315 transmits a power-down command (PCB=0) to a mobile station in step 605. If the SNR is not greater than the threshold, the closed-loop power controller 315 transmits a power-up command (PCB=1) to the mobile station in step 607.

FIG. 4 is a block diagram of a forward link receiver in a DTX mode in the conventional CDMA mobile communication system. The structure and operation of the forward link receiver will be described referring to FIG. 4. In FIG. 4, a squarer 401 squares an input signal in sub-chip units. An accumulator 403 sums sub-chip energies for one Power Control Group (PCG). The sum is estimated as noise energy. A matching filter 405 filters the input signal in sub-chips units. A first despreader 407 PN-despreads the output of the matching filter 405 and outputs the PN-despread signal to a second despreader 409, a channel estimator 411, and a third despreader 413. The third despreader 413 despreads a pilot channel signal included in the PN-despread signal with a Walsh code. An accumulator 415 sums chip energies of the Walsh-spread signal. A squarer 417 squares the sum and outputs the square to an SNR calculator 417. The output of the squarer 417 is estimated as bit energy.

The other components are the same as their counterparts shown in FIG. 3 in structure but labeled with different reference numerals. The forward link receiver also performs a closed-loop power control in the same manner as shown in FIG. 6.

FIG. 5 illustrates DCCH transmission on a forward link and a reverse link in a DTX mode according to the IS-95C standard. The forward DCCH transmits data discontinuously and PCBs continuously regardless of the presence or absence of data. Also on the reverse link, data is discontinuously transmitted on the DCCH. If no data to be transmitted exists, pilot symbols and PCBs are transmitted on a pilot channel. Hence, the DCCH transmits no PCBs.

In the case of a traffic channel which continuously transmits frames, a receiver can perform an outer-loop power control continuously to obtain an intended frame error rate (FER). However, since the DCCH transmits in a DTX mode, the outer-loop power control can be used only when transmission frames are present.

FIG. 7 is a flowchart illustrating a general outer-loop power control method. The outer-loop power control method will be described with reference to FIGS. 3 and 7. Upon receipt of frame data, the outer-loop power controller 329 determines whether a frame error has been generated based on a CRC error check result received from the CRC error detector 321 in step 701. If a frame error exists, the outer-loop power controller 329 receives a frame existence flag from the data detector 323. If the frame existence flag indicates existence of a frame, the outer-loop power controller 323 increases a threshold in step 703. If the frame existence flag indicates the absence of a frame, the outer-loop power controller 323 decreases the threshold for power control in step 705. Procedures other than the above one can be employed for the outer-loop power control.

When the outer-loop power control method and the closed-loop power control method are used concurrently, a threshold updated for each frame in the outer-loop power control method is used as a reference SNR value in the closed-loop power control method.

FIG. 18 is a block diagram of a receiver for processing a DPCH (Dedicated Physical Channel) received in a DTX mode in an asynchronous IMT-2000 system employed in Japan and Europe. In FIG. 18, a channel separator 1805 separates a DPCCH (Dedicated Physical Control Channel) from an input DPCH. A channel estimator 1809 obtains information about channel status from the DPCCH received from the channel separator 1805, using pilot symbols. A multiplier 1806 multiplies DPCCH frame data received from the channel separator 1805 by the channel status information signal received from the channel estimator 1809. An SNR measurer 1807 calculates pilot energy Eb and noise energy Nt from pilot symbols. A bit energy measurer 1815 receives a DPDCH (Dedicated Physical Data Channel) and the multiplied DPCCH, compares their energies, and outputs the comparison result to a data detector 1819. The other components are described above with reference to FIG. 3. For implementation of an outer-loop power control and a closed-loop power control, the European IMT-2000 system is of the same structure and operates in the same manner, except for the above-described components.

As described above, the conventional outer-loop power control method is not applied when no frame exists on a DTX mode channel like a DCCH since an outer-loop power control is performed based on a determination whether a received frame has an error or not.

Therefore, if no frame is to be transmitted in the DTX mode, a threshold set for a previous frame is used. As a result, when frame transmission resumes and the previous threshold is higher than a threshold which should be set for receiving the current frame without errors, unnecessary transmission power is consumed. On the other hand, if the previous threshold is lower than the desired threshold, frame errors are increased. The increase of frame errors and transmission power dissipation decreases communication quality and base station capacity.

SUMMARY OF THE INVENTION

It is, therefore, an object of the present invention to provide a device and method for implementing an outer-loop power control in a DTX mode regardless of the presence or absence of data in a CDMA mobile communication system.

It is another object of the present invention to provide a device and method for implementing an outer-loop power control in a DTX mode regardless of the presence or absence of data by tabulating FERs versus SNRs and determining whether frame errors exist by referring to the table upon absence of transmission data in a CDMA mobile communication system.

It is a further object of the present invention to provide a device and method for implementing an outer-loop power control in a DTX mode regardless of the presence or absence of data by tabulating FERs versus data service types and determining whether frame errors exist by referring to the table upon absence of transmission data in a CDMA mobile communication system.

These and other objects can be achieved by providing an outer-loop power control device and method in a DTX mode in a CDMA mobile communication system. According to an embodiment of the present invention, in an outer-loop power control method for a non-frame data transmission period of a dedicated control channel (DCCH) which transmits frame data discontinuously, the signal-to-noise ratio (SNR) of power control bits (PCBs) received at a mobile station from a base station is measured over the frame period, and it is determined whether the frame has errors based on the measured SNR. A closed-loop power control threshold is increased if a frame error exists and decreased if no frame errors exist.

According to another aspect of the present invention, in an outer-loop power control device for a non-frame data transmission period of a DCCH which transmits frame data discontinuously, an SNR measurer measures the SNR of PCBs received at a mobile station from a base station for the frame period, a frame error detector determines whether the frame has an error based on the measured SNR and outputs a frame error indicator according to the determination, and an outer-loop power controller controls a closed-loop power control threshold according to the frame error indicator.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail to avoid obscuring the invention in unnecessary detail.

In accordance with an outer-loop power control method of the present invention, it is determined whether a real frame error has occurred if a frame exists, and the presence or absence of a frame error is estimated if no frames exist. That is, an outer-loop power control is continuously implemented in a non-frame transmission period as well as a frame transmission period of a DCCH which operates in a DTX mode.

Figure 1A:
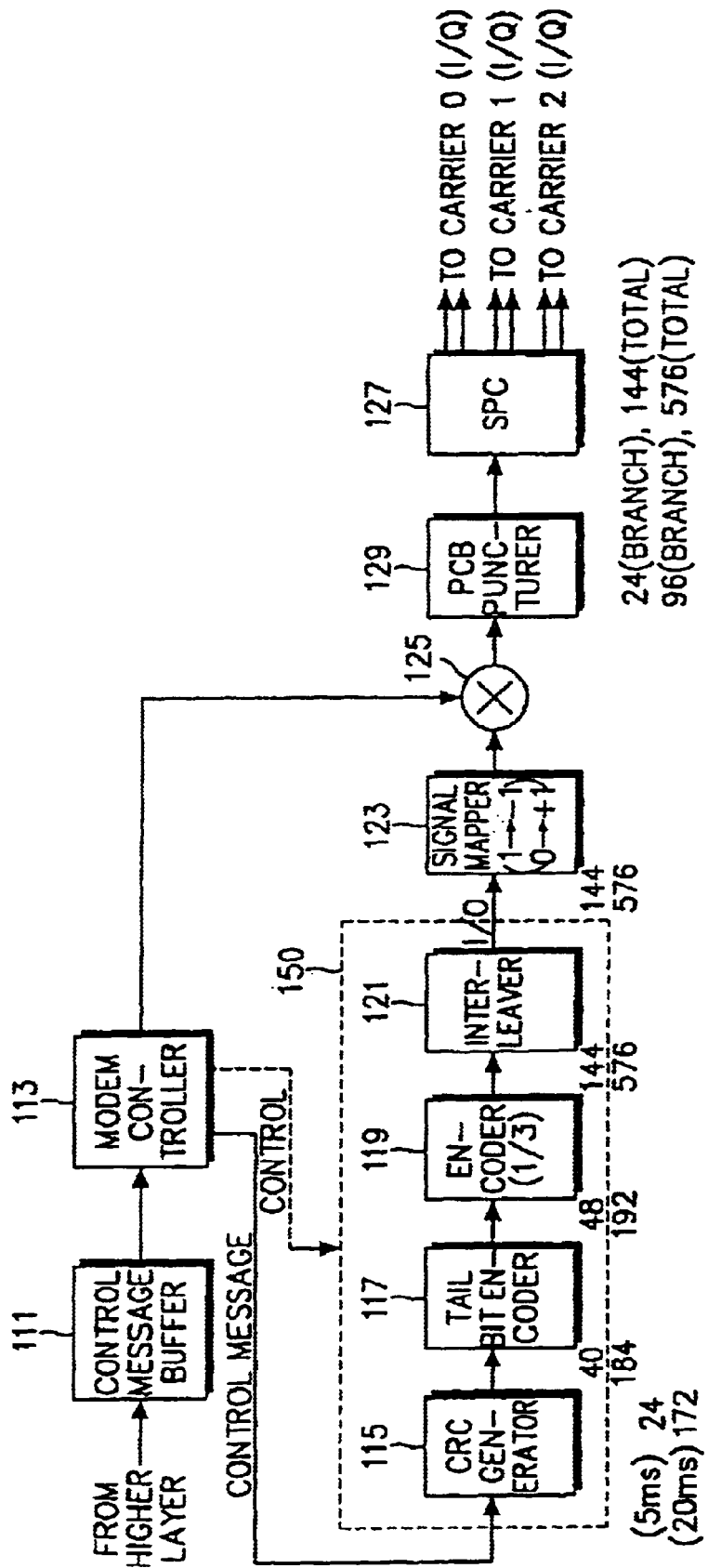
FIGS. 1A and 1B are block diagrams of a forward DCCH transmitter in a DTX mode in a conventional CDMA mobile communication system.
Figure 1B:
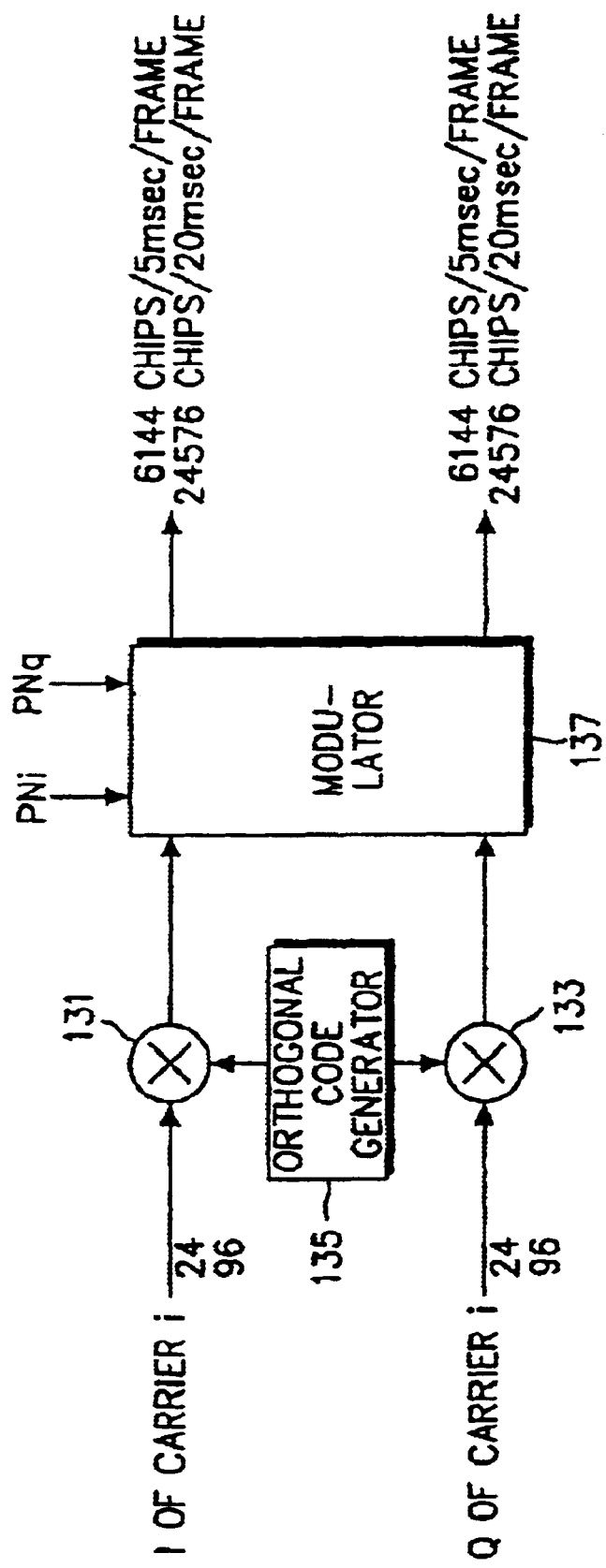
Figure 2:
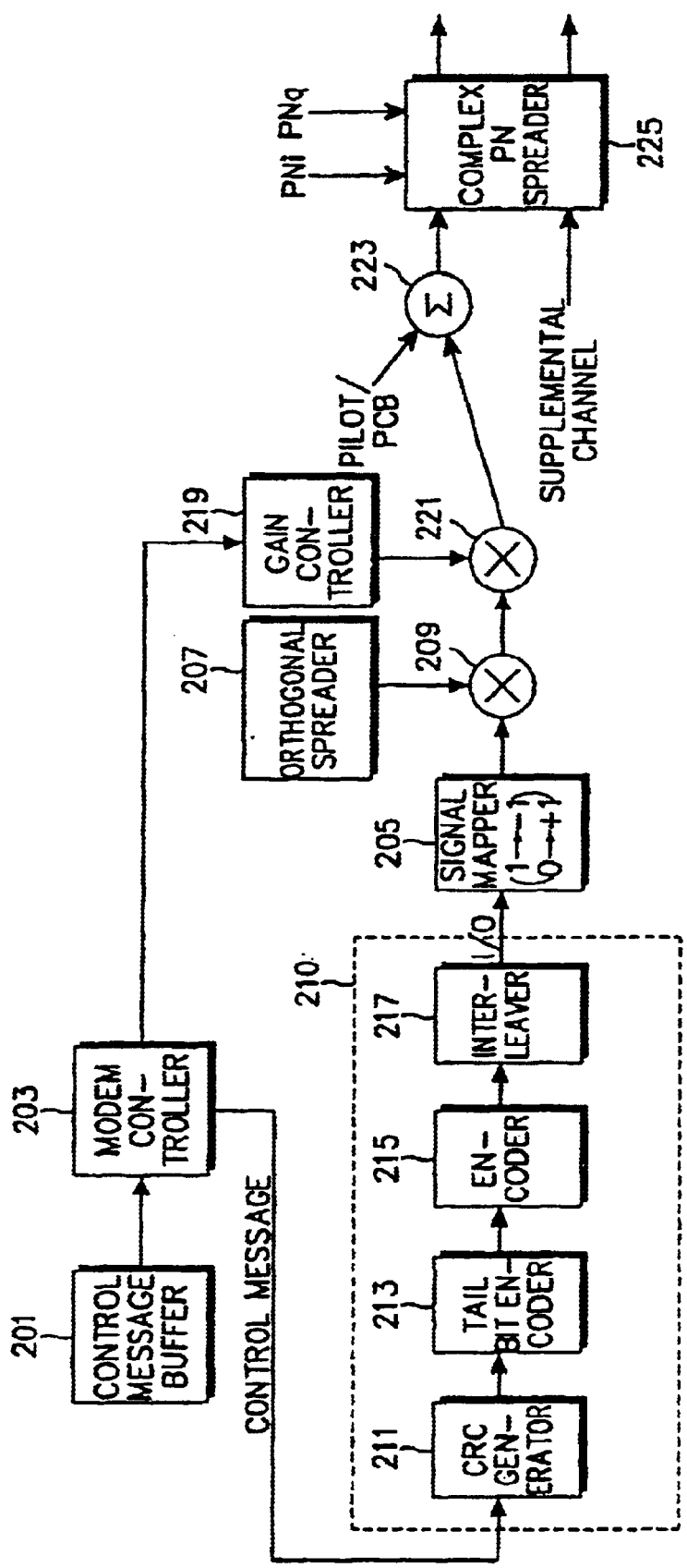
FIG. 2 is a block diagram of a reverse link transmitter in a DTX mode in the conventional CDMA mobile communication system.
Figure 3:
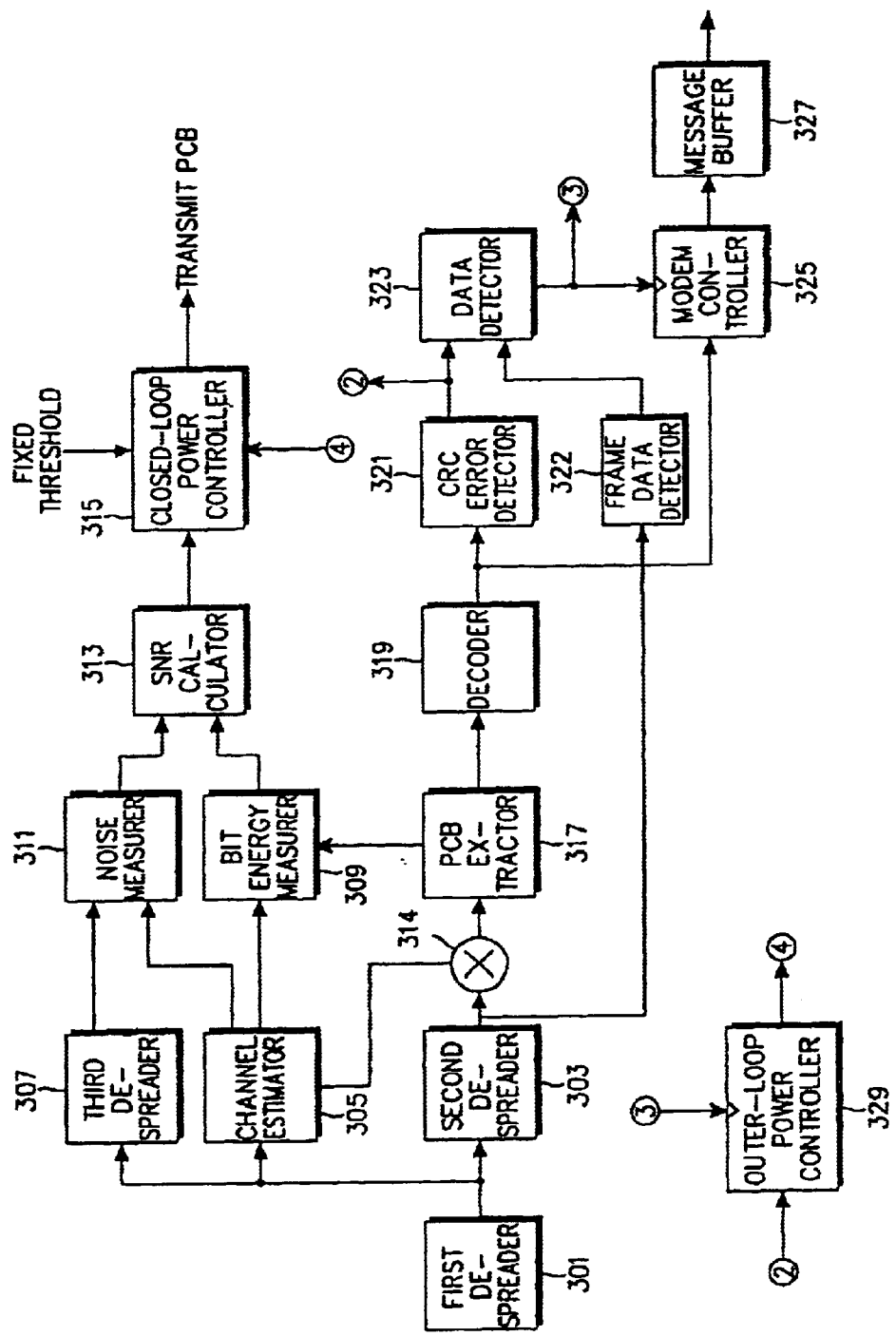
FIG. 3 is a block diagram of a reverse link receiver in a DTX mode in the conventional CDMA mobile communication system.
Figure 4:
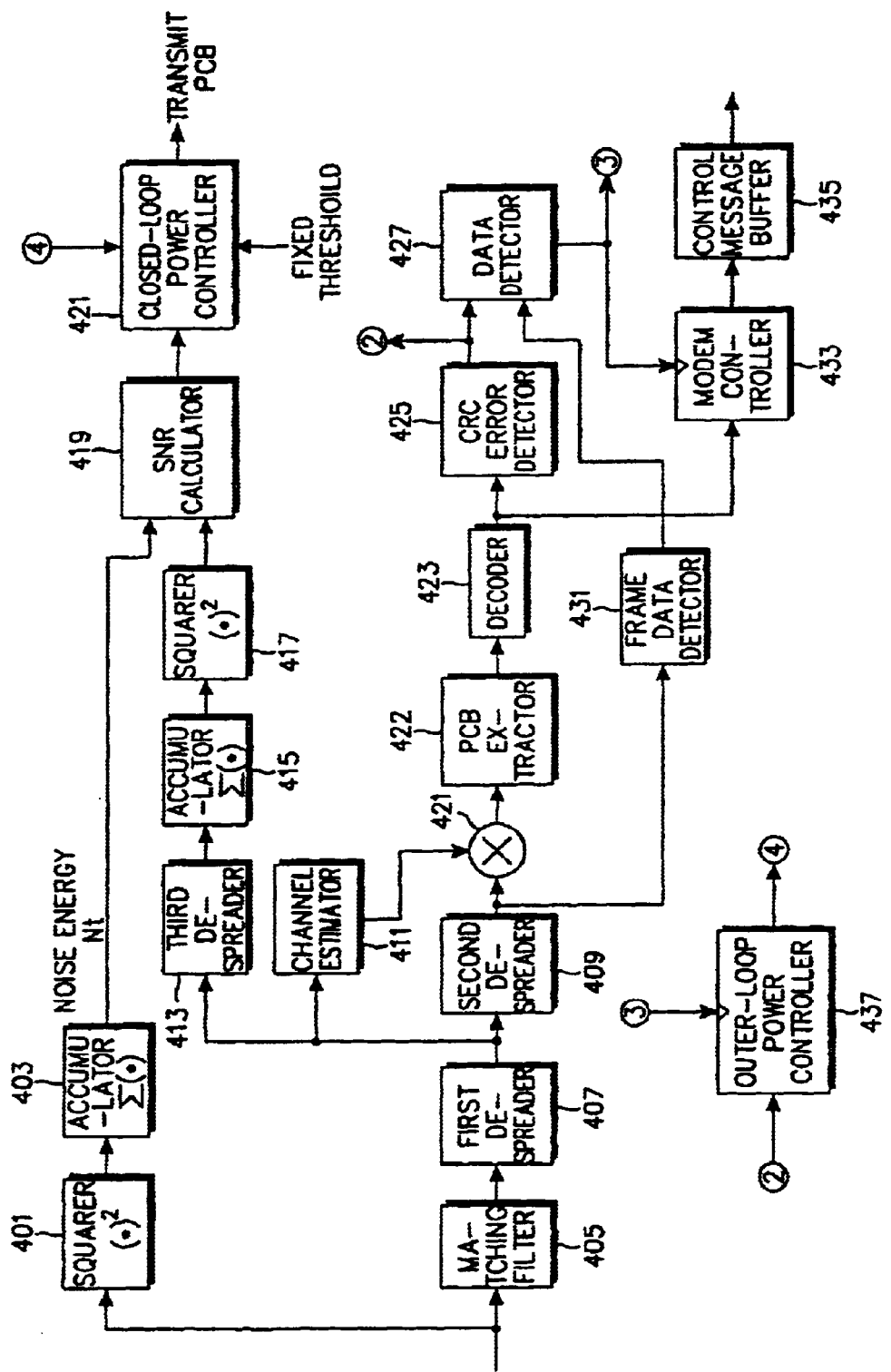
FIG. 4 is a block diagram of a forward link receiver in a DTX mode in the conventional CDMA mobile communication system.
Figure 5:
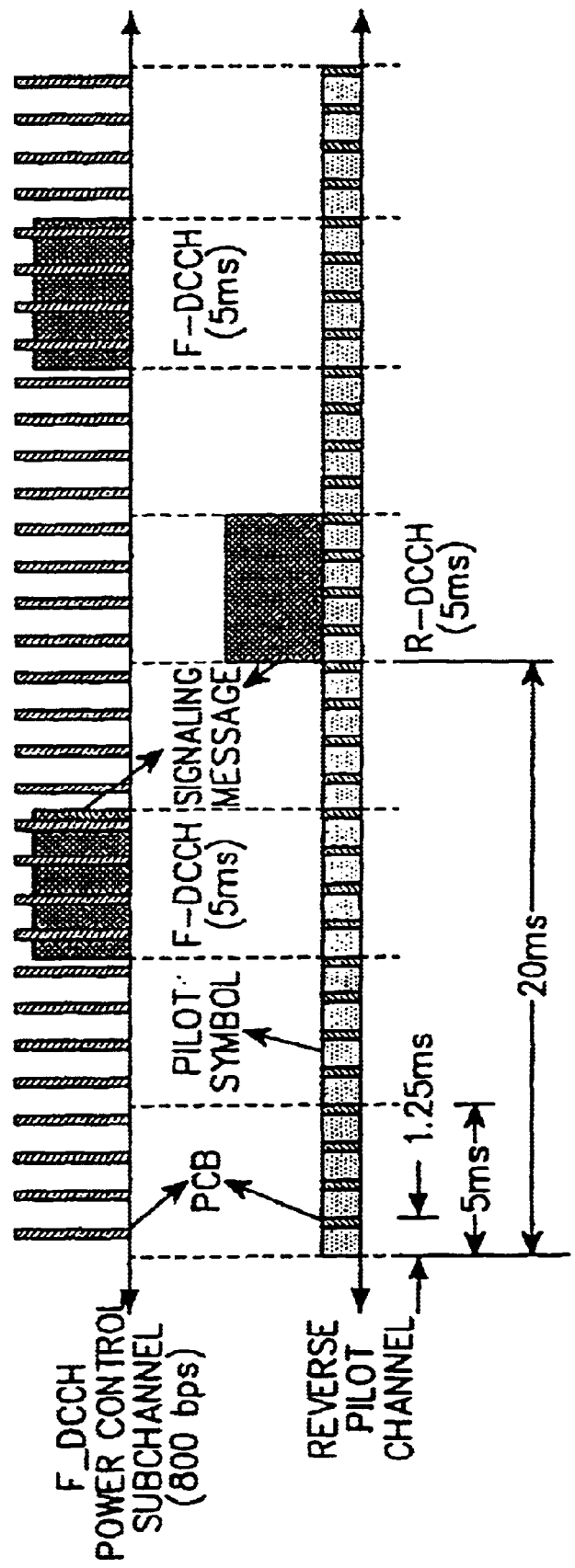
FIG. 5 illustrates a forward DCCH and a reverse DCCH transmitted in a DTX mode in IS-95C.
Figure 6:
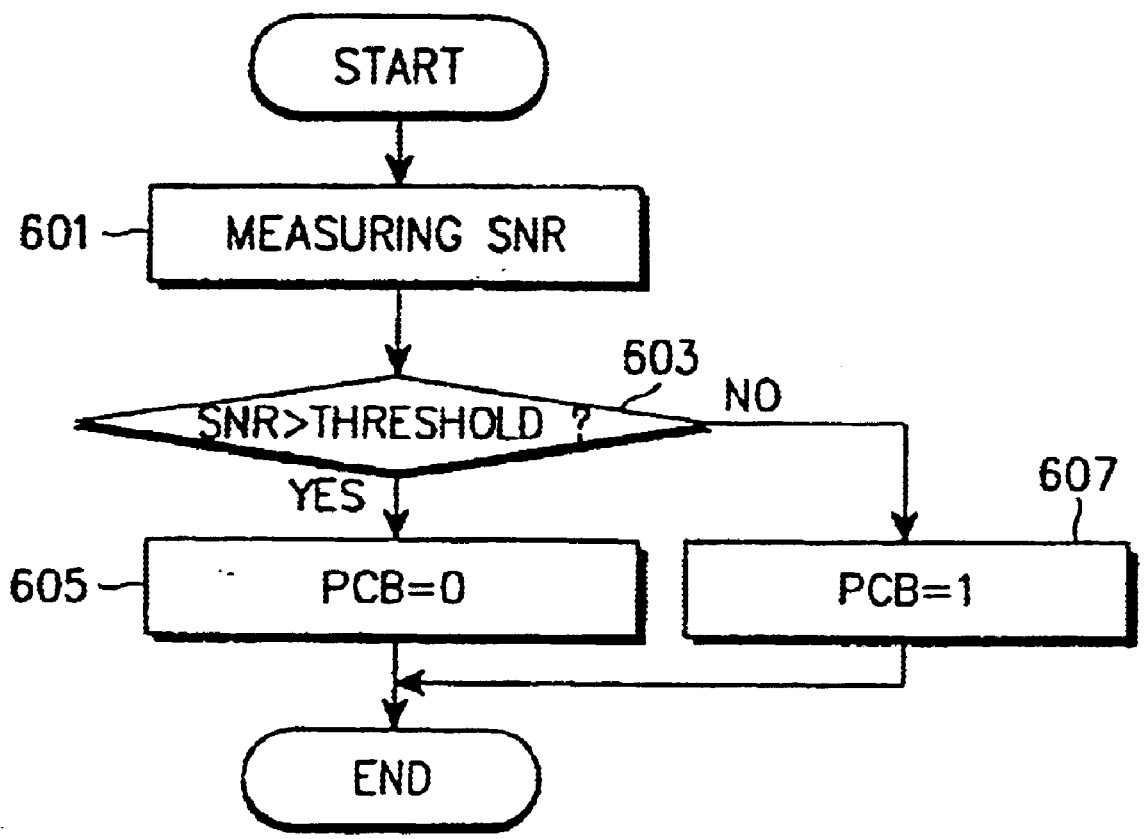
FIG. 6 is a flowchart illustrating a closed-loop power control method.
Figure 8:
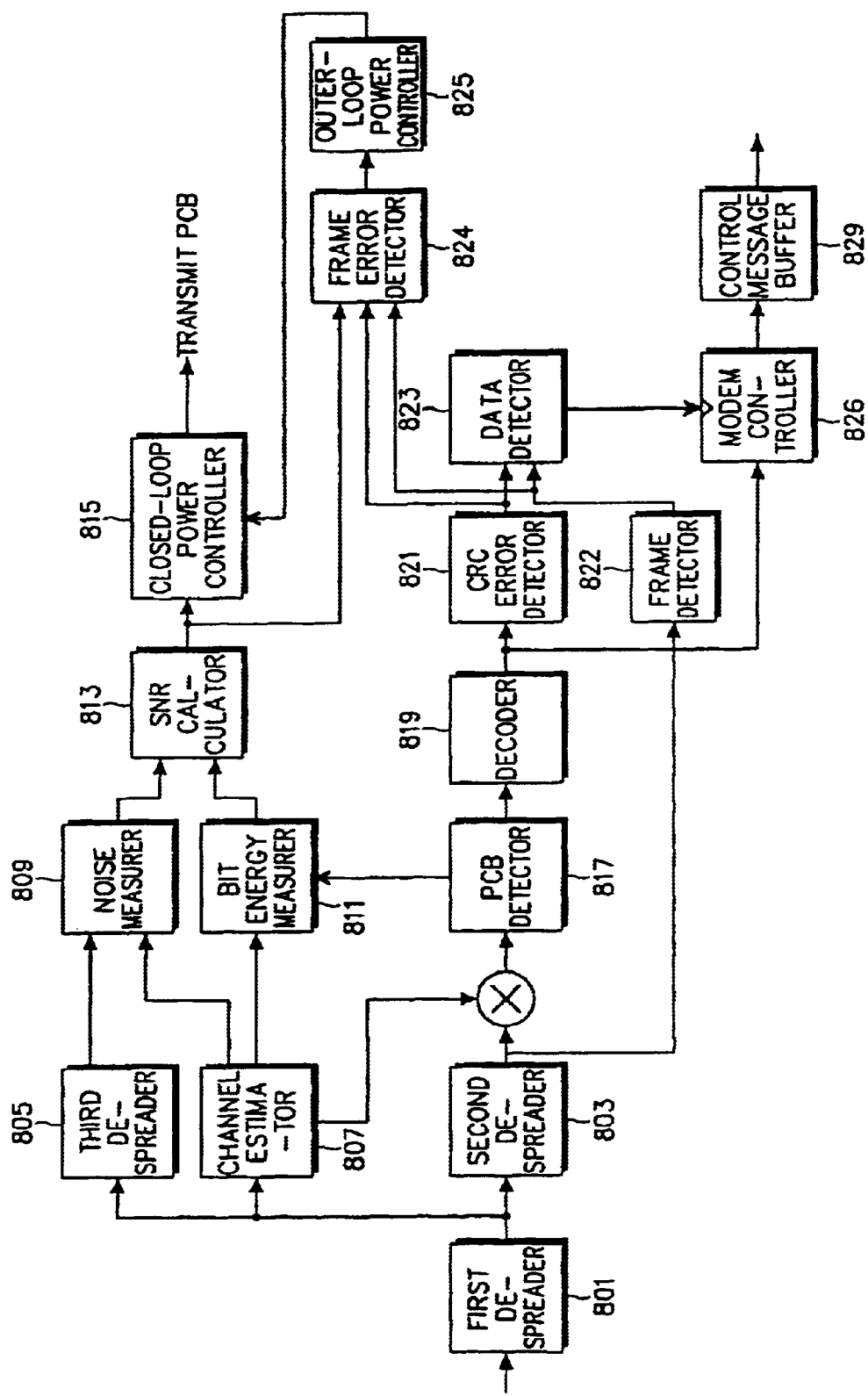
FIG. 8 is a block diagram of an embodiment of a reverse link receiver for outer-loop power control in a DTX mode according to the present invention.

FIG. 8 is a block diagram of a receiver for outer-loop power control on a reverse link in a DTX mode. The components are similar to those shown in FIG. 3 and will be described briefly hereinbelow where necessary.

Referring to FIG. 8, a CRC error detector 821 determines whether frame data received from a decoder 819 has errors and outputs a CRC error check result to a data detector 823 and a frame error detector 824. A frame detector 822 measures the energy of a DCCH to determine whether frame data exists or not. If the measured energy is greater than a predetermined level, the frame detector 822 determines that frame data exists and outputs a frame existence flag set to 1 to data detector 823. If no frame exists, the frame existence flag is set to 0. Upon receipt of the frame error value from the CRC error detector 821 and the frame existence flag set to 1 from the frame detector 822, the data detector 823 outputs an on/off control signal to a MODEM controller 826 and the frame error detector 824.

An SNR calculator 813 calculates an SNR from noise energy Nt received from a noise measurer 809 and bit energy Eb received from a bit energy measurer 811.

The frame error detector 824 receives the SNR from the SNR calculator 813, the CRC error check result from the CRC error detector 821, and the frame existence flag message from the frame detector 822, and determines whether frame errors have been generated. If it turns out that frame errors exist, the frame error detector 824 outputs a frame error indicator to an outer-loop power controller 825.

The outer-loop power controller 825 performs an outer-loop power control and outputs a threshold to a closed-loop power controller 815. Then, the closed-loop power controller 815 performs a closed-loop power control using the threshold.

Figure 9:
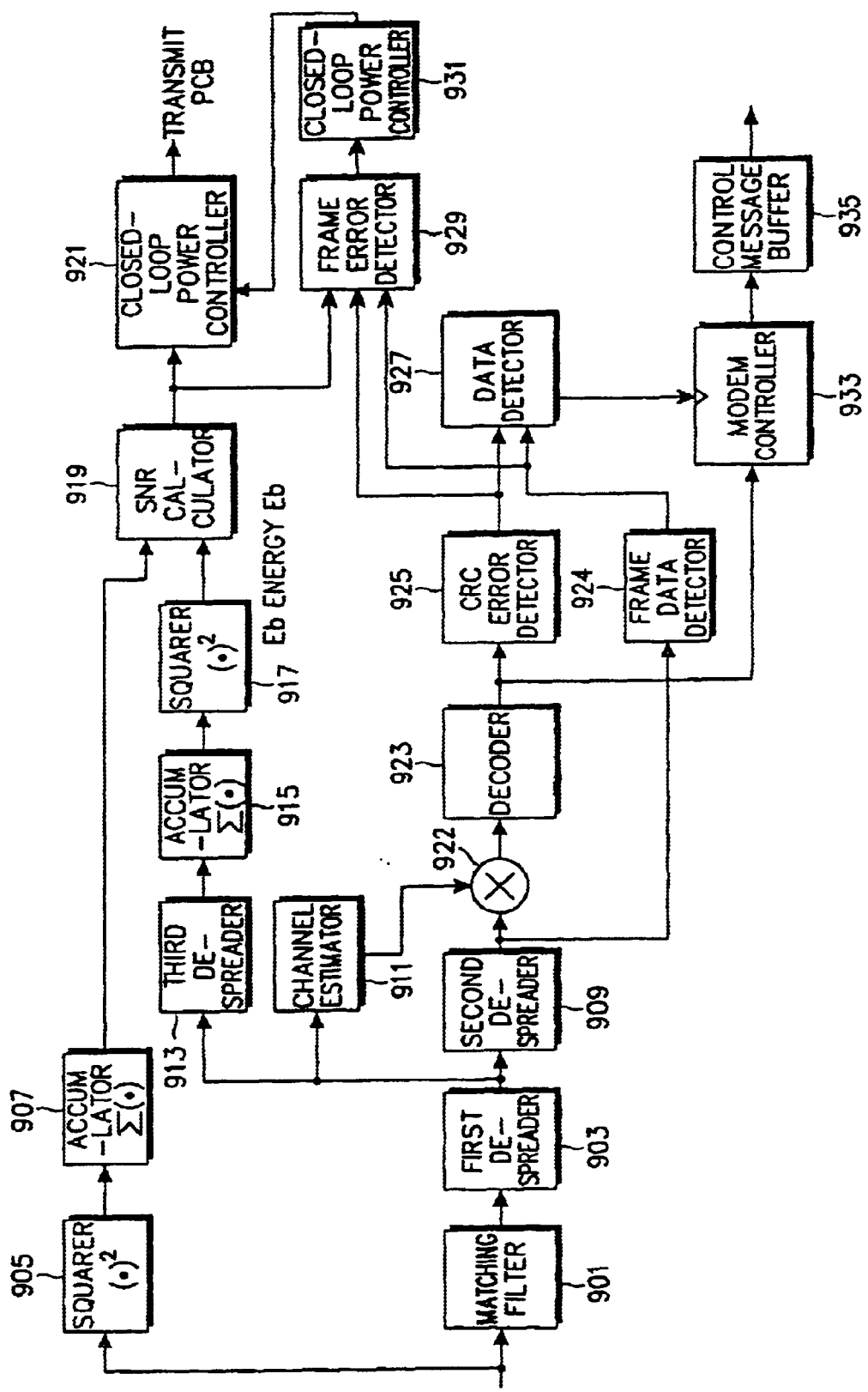
FIG. 9 is a block diagram of an embodiment of a forward link receiver for outer-loop power control in a DTX mode according to the present invention.

FIG. 9 is a block diagram of a forward link receiver in a DTX mode. Referring to FIG. 9, a decoder 923 outputs data in frame units to a CRC error detector 925 and a MODEM controller 933. The CRC error detector 925 determines whether the frame data has errors and outputs a CRC error check result to a data detector 927 and a frame error detector 929. A frame detector 924 measures the energy of a DCCH to determine whether frame data exists or not. If the measured energy is greater than a predetermined level, the frame detector 924 determines that frame data exists and outputs a frame existence flag set to 1 to the data detector 927. If no frame exists, the frame existence flag is set to 0. Upon receipt of the frame error value from the CRC error detector 925 and the frame existence flag set to 1 from the frame detector 924, the data detector 927 outputs an on/off control signal to the MODEM controller 933 and the frame error detector 929.

An SNR calculator 919 calculates an SNR from Nt measured from an input signal in sub-chip units by a squarer 905 and an accumulator 907 and bit energy Eb measured from the output of a third Walsh despreader 913 by an accumulator 915 and a squarer 917.

The frame error detector 929 receives the SNR from the SNR calculator 919, the CRC error check result from the CRC error detector 925, and the frame existence flag message from the frame detector 924, and determines whether frame errors have been generated. If frame errors exist, the frame error detector 929 outputs a frame error indicator to an outer-loop power controller 931.

The outer-loop power controller 931 performs an outer-loop power control and outputs a threshold to a closed-loop power controller 921. Then, the closed-loop power controller 921 performs a closed-loop power control using the threshold. The remainder of the components shown operate similar to those shown in FIG. 3.

A frame error detector according to the present invention can operate in many ways. The operation and structure of a frame error detector in a receiver according to the present invention will be described referring to FIGS. 10 and 10B.

Figure 10A:
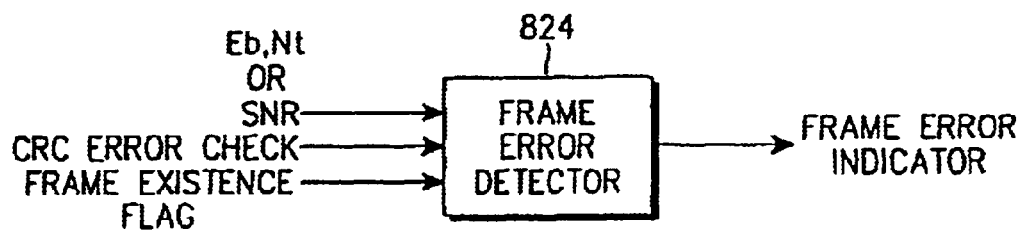
FIGS. 10A and 10B are block diagrams of the frame error detector shown in FIG. 8 for outer-loop power control in a DTX mode.
Figure 10B:
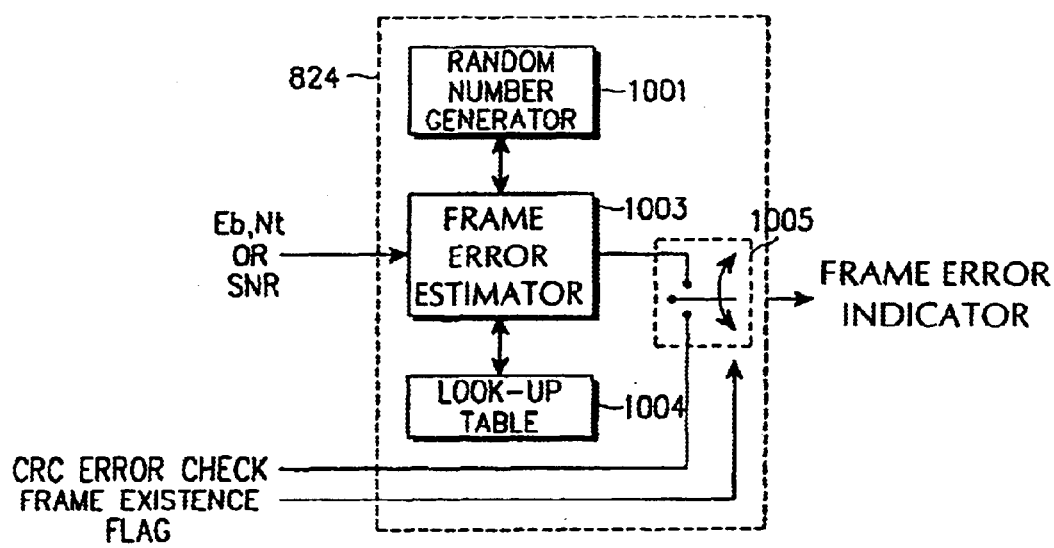

FIG. 10A illustrates input and output of the frame error detector according to an embodiment of the present invention and FIG. 10B is a detailed block diagram of the frame error detector.

Referring to FIG. 10A, the frame error detector of FIG. 8 or 9 (824 or 929) outputs a frame error indicator indicating the presence or absence of a frame error, for the input of an SNR, a CRC error check result, and a frame existence flag message.

Figure 14A:
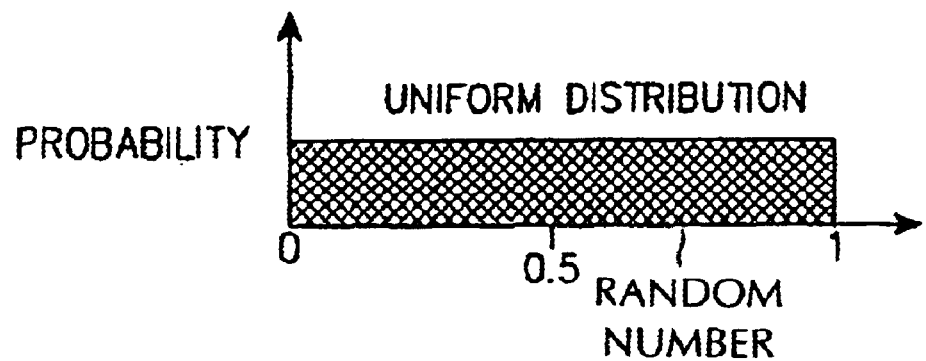
FIG. 14A illustrates the range of random numbers generated according to the first embodiment of the present invention.
Figure 14B:
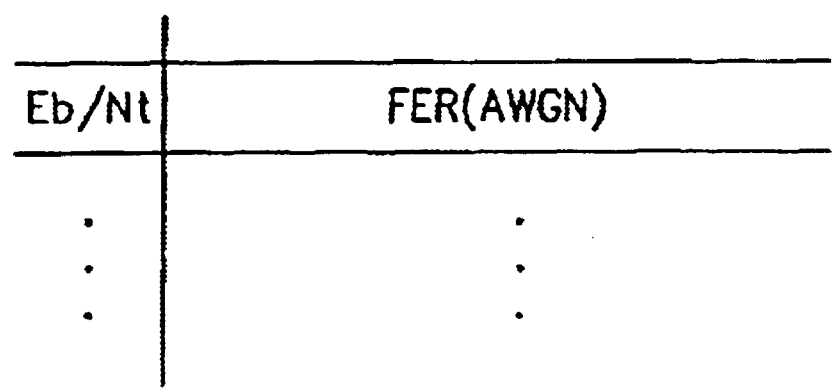
FIG. 14B illustrates a look-up table with FERs versus SNRs according to the first embodiment of the present invention.

In FIG. 10B, the frame error detector includes a frame error estimator 1003, a random number generator 1001, a look-up table 1004, and a switch 1005. The look-up table 1004 tabulates FERs versus SNRs as shown in FIG. 14B. The random number generator 1001 generates a random number NR under the control of the frame error estimator 1003. As shown in FIG. 14A, the random numbers range from 0 to 1. The frame error estimator 1003 has a buffer (not shown), receives an SNR from the SNR calculator (813 or 919), adds a predetermined offset value to the SNR, reads an FER corresponding to the resulting SNR from the look-up table 1004, and stores the FER in the buffer. Then, the frame error estimator 1003 controls the random number generator 1001 to generate a random number and determines whether the generated random number is greater than the stored FER. If the random number is not smaller than the FER, the frame error estimator 1003 considers that no frame errors have occurred and outputs a frame error message '0' to the outer-loop power controller (822 or 924). If the random number is smaller than the FER, the frame error estimator 1001 considers that frame errors have been generated and outputs a frame error message '1' to the outer-loop power controller. The switch 1005 is switched by the frame existence flag message received from the frame detector (823 or 927). If the frame existence flag message is 1, the switch 1005 is switched to the CRC error check result and if it is 0, the switch 1005 is switched to the frame error estimator 1003.

Figure 11:
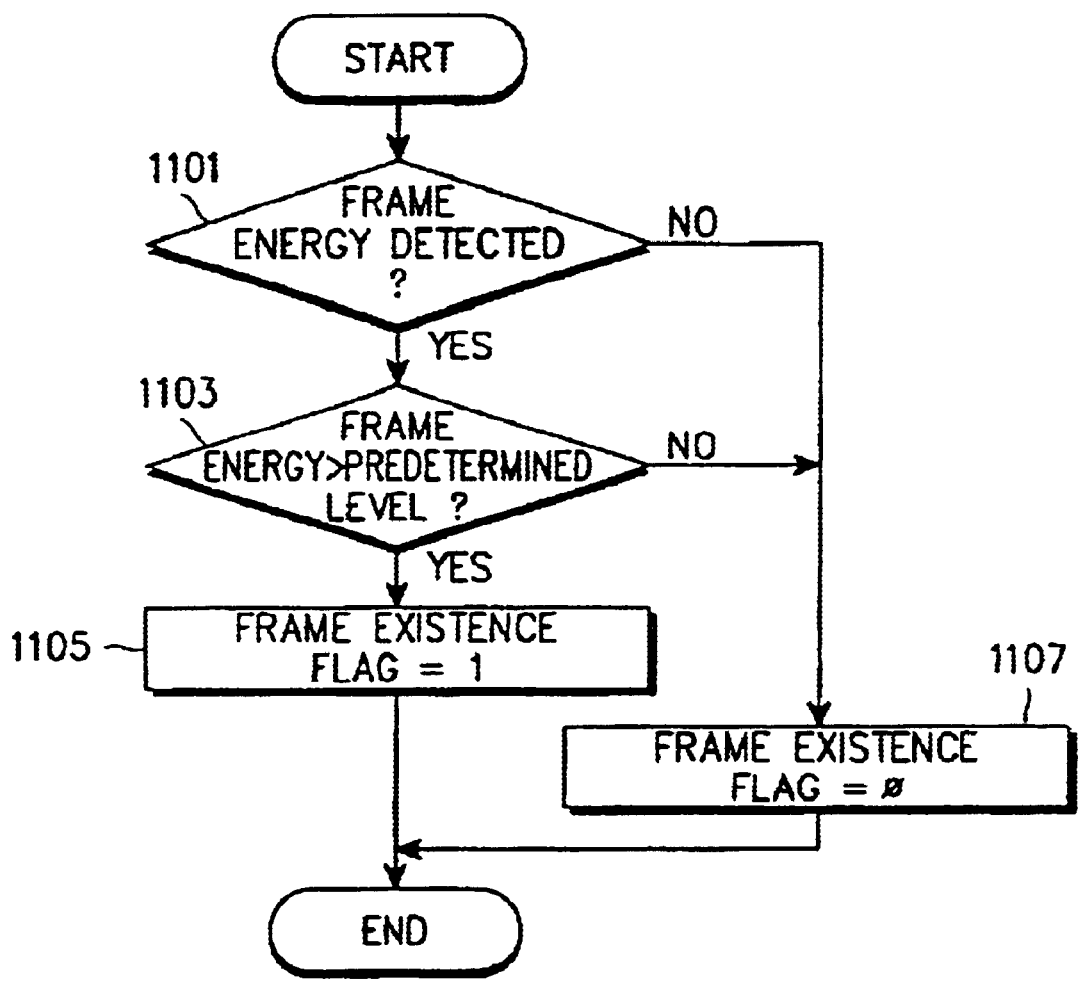
FIG. 11 is a flowchart illustrating the operation of a data detector, for a continuous outer-loop power control using frame energy in a DTX mode.

FIG. 11 is a flowchart illustrating the operation of a data detector for switching the switch shown in FIG. 10B.

Referring to FIG. 11, the data detector 823 determines whether frame energy has been received from the frame detector 822 in step 1101. Upon receipt of the frame energy, the data detector 823 determines whether the frame energy is a predetermined level or greater in step 1103. If it is, the data detector 823 outputs a frame existence flag set to 1 to the switch 1005 in step 1105. If the frame energy is smaller than the predetermined level, the data detector 823 outputs the frame existence flag set to 0 to the switch 1005 in step 1107. After step 1105 or 1107, the procedure ends.

Figure 12A:
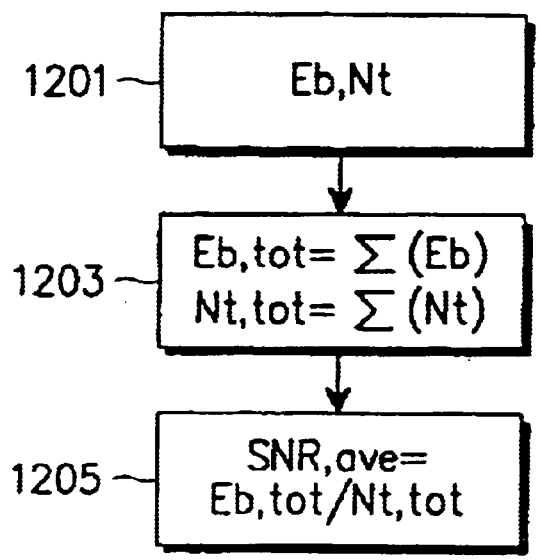
FIGS. 12A and 12B are flowcharts illustrating embodiments of an SNR measuring method for power control.
Figure 12B:
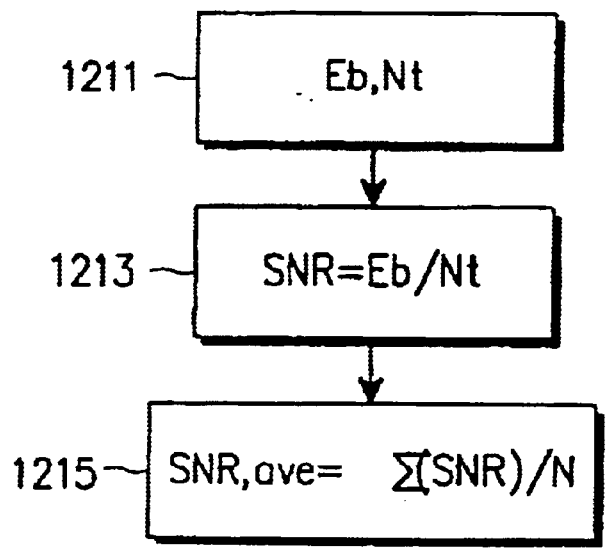

FIGS. 12A and 12B illustrate embodiments of a method of measuring an SNR for one frame in the frame error estimator 1003 shown in FIG. 10B. In the first embodiment, upon receipt of Nt and Eb in PCG units in step 1201, the frame error estimator 1003 obtains a total Eb (Eb, tot) and a total Nt (Nt, tot) for the entire frame in step 1203 and calculates an average SNR (SNR, ave) from Eb, ave and Nt, ave in step 1205. In the second embodiment, the frame error estimator 1003 calculates an SNR (=Eb/Nt) for each PCG in step 1213 and an average SNR (SNR, ave) for one frame in step 1215. The average SNR in the first and second embodiments can be calculated respectively by equations (1) and (2) as follows:

$$SNR_{ave} = \frac{E_b(1) + E_b(2) + \ldots E_b(N)}{N_t(1) + N_t(2) + \ldots N_t(N)} \tag{1}$$

$$SNR_{ave} = \left(\frac{E_b(1)}{N_t(1)} + \frac{E_b(2)}{N_t(2)} + \ldots \frac{E_b(N)}{N_t(N)} + \right)/N \tag{2}$$

where N is the number of PCGs in one frame.

The SNR of one frame may be calculated in other ways also.

If no frame data has been received, a frame error can be estimated in many ways, as described below.

Figure 13:
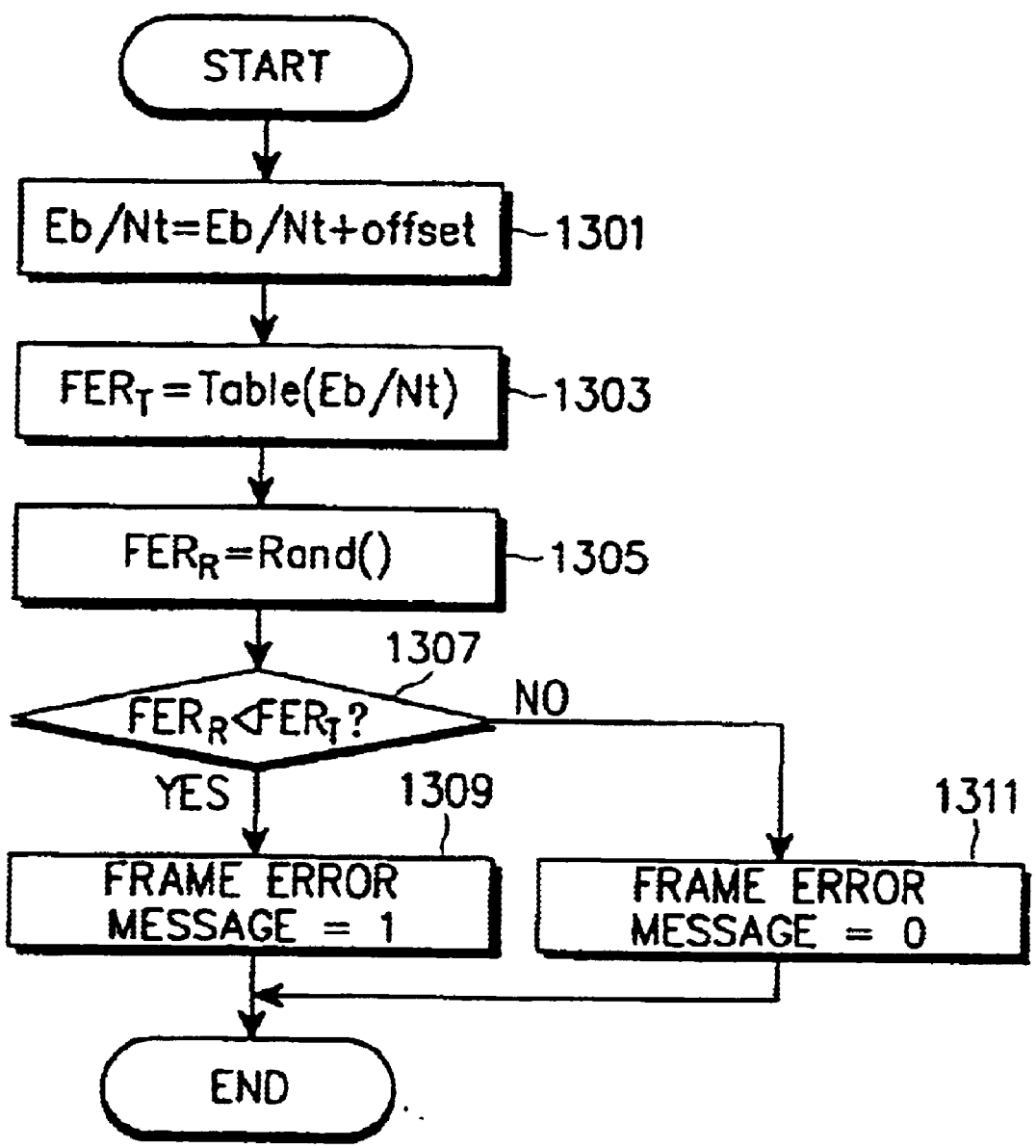
FIG. 13 is a flowchart illustrating a first embodiment of a frame error estimating method when no frame is transmitted.

FIG. 13 is a flowchart illustrating an embodiment of a frame error estimation method when no frame has been received. Referring to FIG. 13, the frame error detector 824 calculates a final SNR by adding an offset value to an SNR calculated by Eb/Nt in step 1301. Here, Nt is noise energy measured from additive white Gaussian noise (AWGN) by the noise measurer 809 and Eb is bit energy measured by the bit energy measurer 811. On the assumption that a final SNR of one frame is approximate to an SNR in the AWGN, an FER corresponding to the SNR in the AWGN is obtained from a look-up table. In this case the measured SNR may be different from the SNR in the look-up table, to some extent, and this difference is compensated for. The compensation value is preset or received from a transmitter in advance.

In step 1303, the frame error detector 824 reads an FER corresponding to the SNR from the look-up table 1004 shown in FIG. 10B and stores the FER in the buffer. In the look-up table, FERs are listed with respect to SNRs. Here, the SNRs or the FERs can be arranged in predetermined intervals. In step 1305, the frame error estimator 1003 controls the random number generator 1001 to generate a random number. Upon receipt of the random number, the frame error estimator 1003 compares the random number with the FER in step 1307. If the random number is smaller than the FER, the frame error estimator 1003 outputs a frame error message '1' to the outer-loop power controller 825 in step 1309. If the random number is not smaller than the FER, the frame error estimator 1003 outputs a frame error message '0' to the outer-loop power controller 825 in step 1311.

Figure 15:
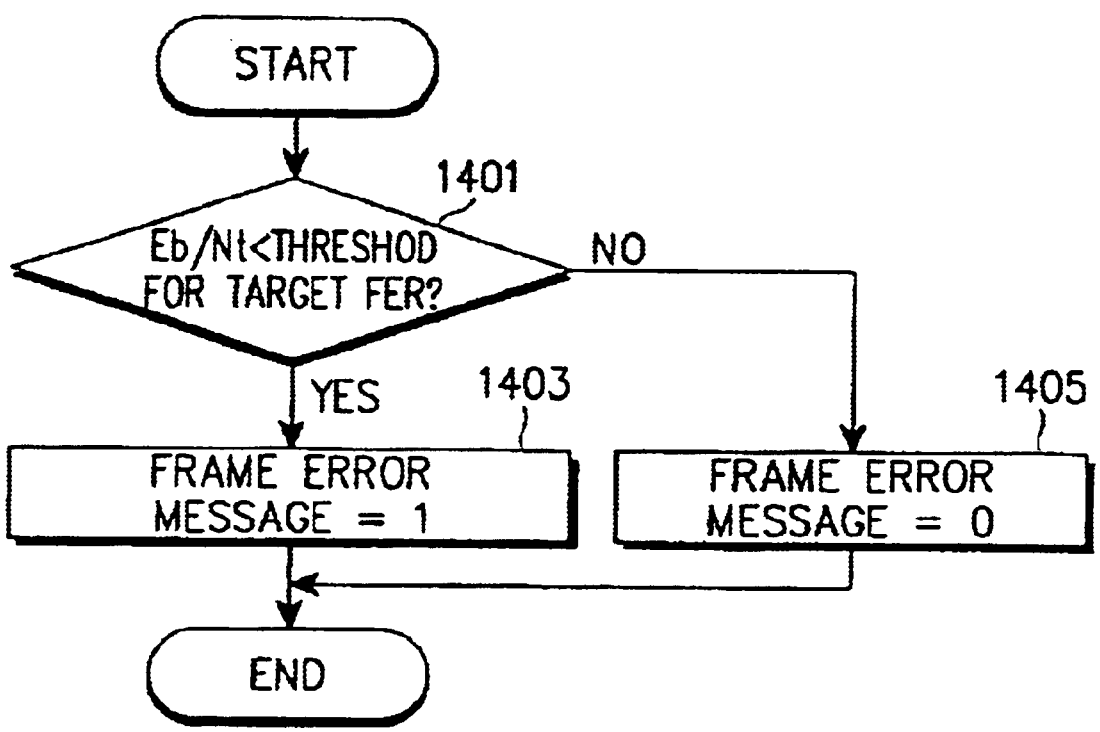
FIG. 15 is a flowchart illustrating a second embodiment of a frame error estimating method when no frame is transmitted.

FIG. 15 is a flowchart illustrating another embodiment of the frame error estimation method when no frame data has been received. In the second embodiment, a frame error is estimated by comparing an SNR measured in frame units with a fixed threshold or an externally received threshold. That is, if the measured SNR is smaller than the threshold, it is determined that frame errors have been generated and the frame error message is "1". If the SNR is greater than or equal to the threshold, it is determined that no frame errors have been generated and the frame error message is "0". The comparison is performed in step 1401. The frame error estimator 1003 outputs the estimate to the outer-loop power controller 825 in steps 1403 and 1405 when the frame error message is "1" and "0", respectively.

Figure 16:
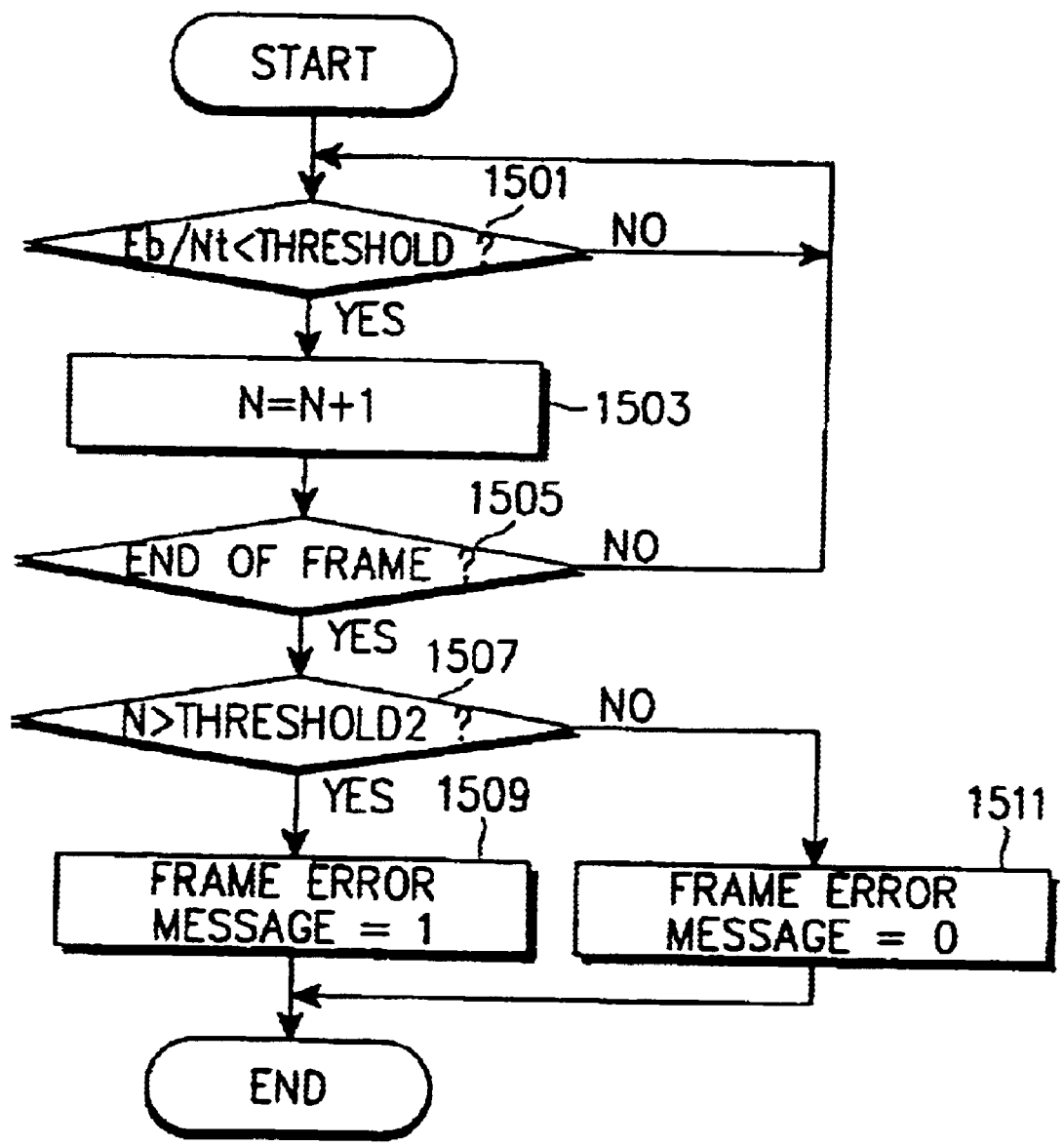
FIG. 16 is a flowchart illustrating a third embodiment of a frame error estimating method when no frame is transmitted.

FIG. 16 is a flowchart illustrating a third embodiment of the frame error estimation method when no frame data has been received. In step 1501, the frame error detector 824 estimates a frame error by comparing an SNR measured in PCG units with a first threshold preset or externally received. In step 1503, the frame error detector 824 increases the count number of SNRs by one in PCGs smaller than the first threshold. The frame error detector 824 determines whether SNRs are completely measured in all PCGs of one frame in step 1505 and compares the count value with a second threshold in step 1507. If the count value is greater than the second threshold, the frame error detector 824 determines that frame errors have occurred and outputs a frame error message '1' to the outer-loop power controller 825 in step 1509. If the count value is not greater than the second threshold, the frame error detector 824 considers that no frame errors have been generated and outputs a frame error message '0' to the outer-loop power controller 825 in step 1511. The thresholds can be preset or received from the transmitter in advance.

Figure 17:
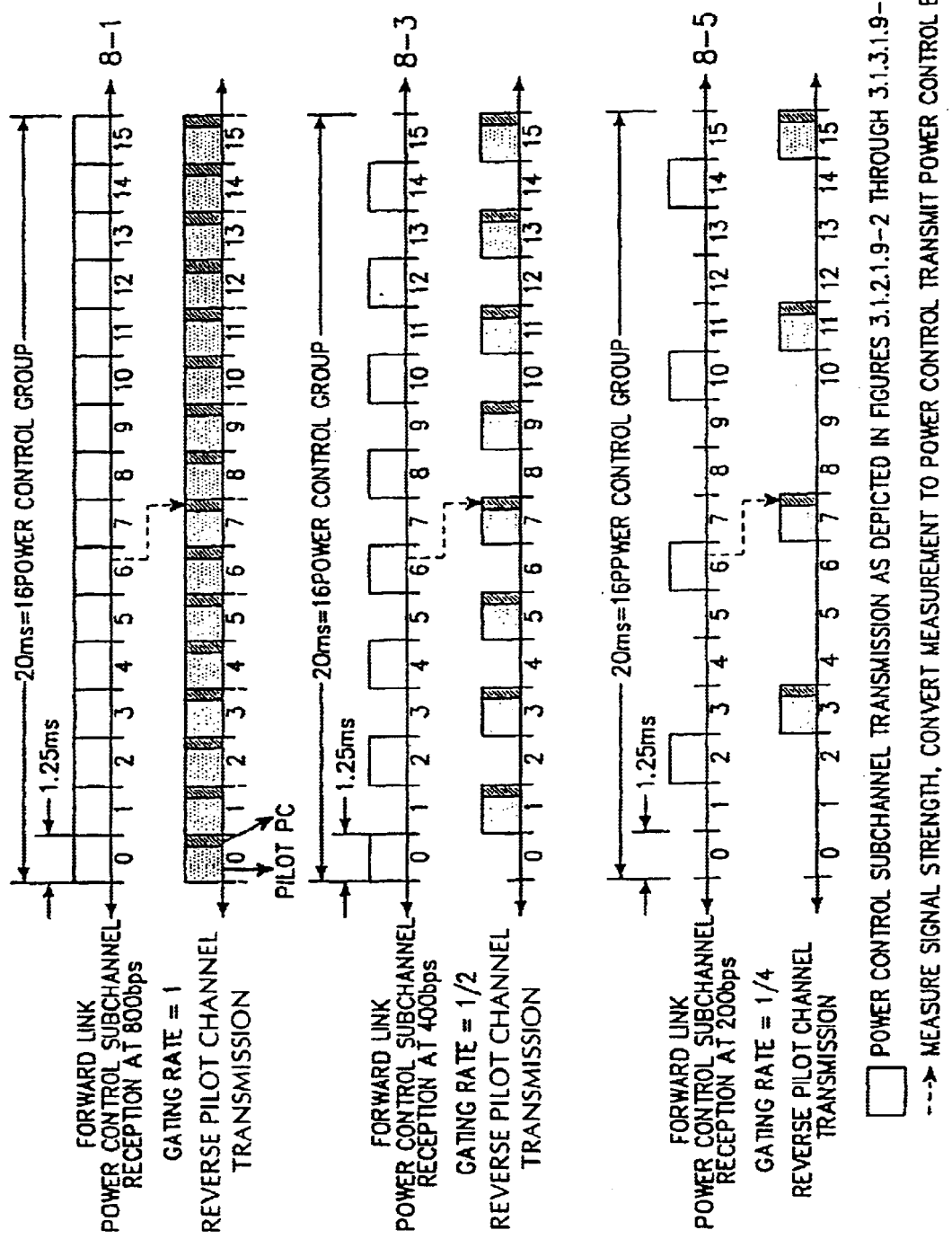
FIG. 17 illustrates signal transmission when transmission is gated in a DTX mode.

FIG. 17 illustrates transmission gating in a DTX mode. Case 8-1 shows no gated transmission, case 8-3 shows ½ gating, and case 8-5 shows ¼ gating. PCBs are also gated at a corresponding gating rate at transmission gating on; a forward link. Even though a gating occurs, the same effects that are produced from a no-gated case are observed except that the number of PCBs to be calculated is reduced. Therefore, the above-described outer-loop power control methods can be applied to the gated mode, that is, the method of changing a threshold by adapting an outer-loop power control based on the determination whether a real frame error is present or not only in a frame transmission period and the method of performing an outer-loop power control using the determination whether a real frame error is present or not in a frame transmission period and estimating the presence or absence of a frame error in a non-frame transmission period. Or the outer-loop power control may not be applied to the gated mode.

Figure 20:
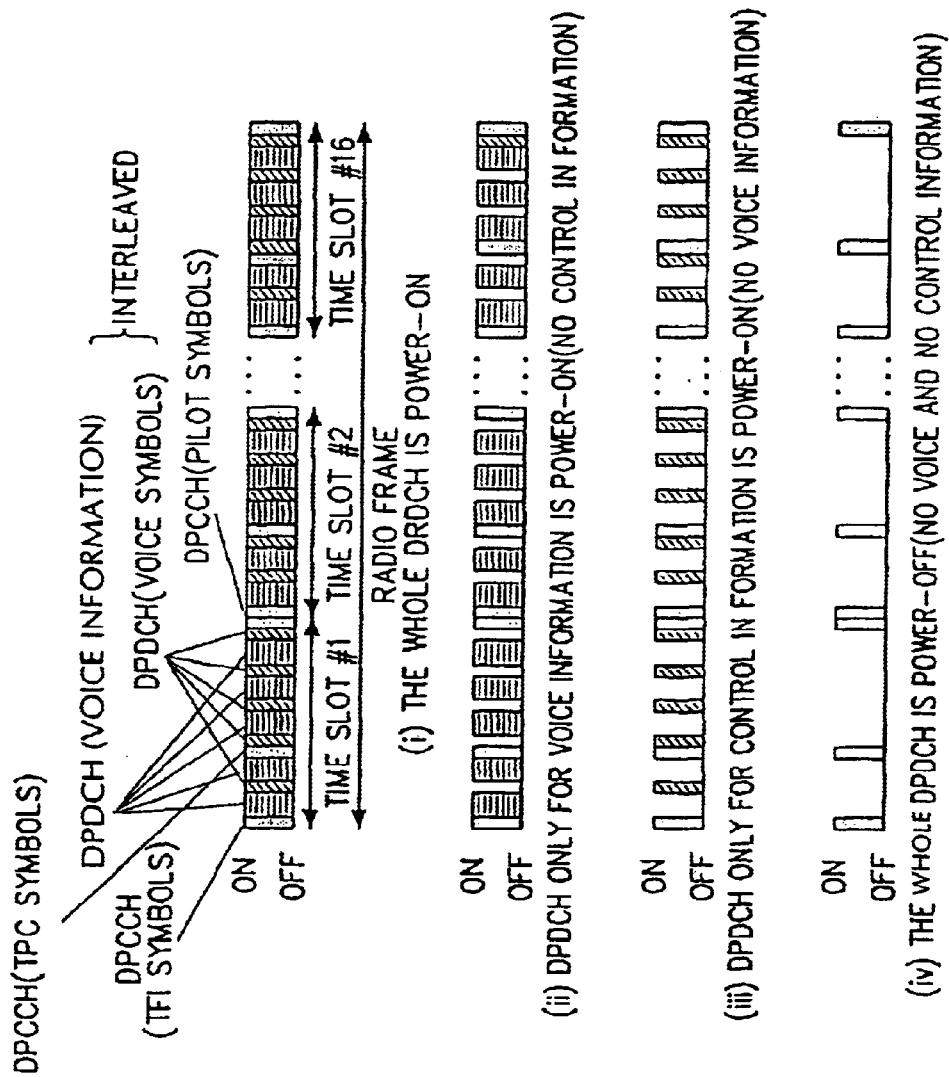
FIG. 20 illustrates the structure of a DPCH which transmits frames asynchronously in a DTX mode according to the present invention.

FIG. 20 illustrates transmission of a DPCH in a DTX mode in an asynchronous Japanese and European IMT-200 system. DPCHs include a DPDCH for data transmission and a DPCCH for recovering the DPDCH. The DPDCH in turn includes a DCCH for logic control and a DTCH (Dedicated Traffic Channel) for transmission of voice information. The DPCCH has a pilot symbol for providing channel information and a TPC (Transmission Power Control) for power control. There are four cases in the figure: (i) transmission of both the DPDCH and the DPCCH; (ii) non-transmission of DCCH information; (iii) non-transmission of DTCH; and (iv) transmission of DPCCH only without DPDCH. It is noted from the four cases that the DPCCH is continuously transmitted. Therefore, a continuous outer-loop power control is possible using pilot symbols of the DPCCH, as stated before.

Figure 7:
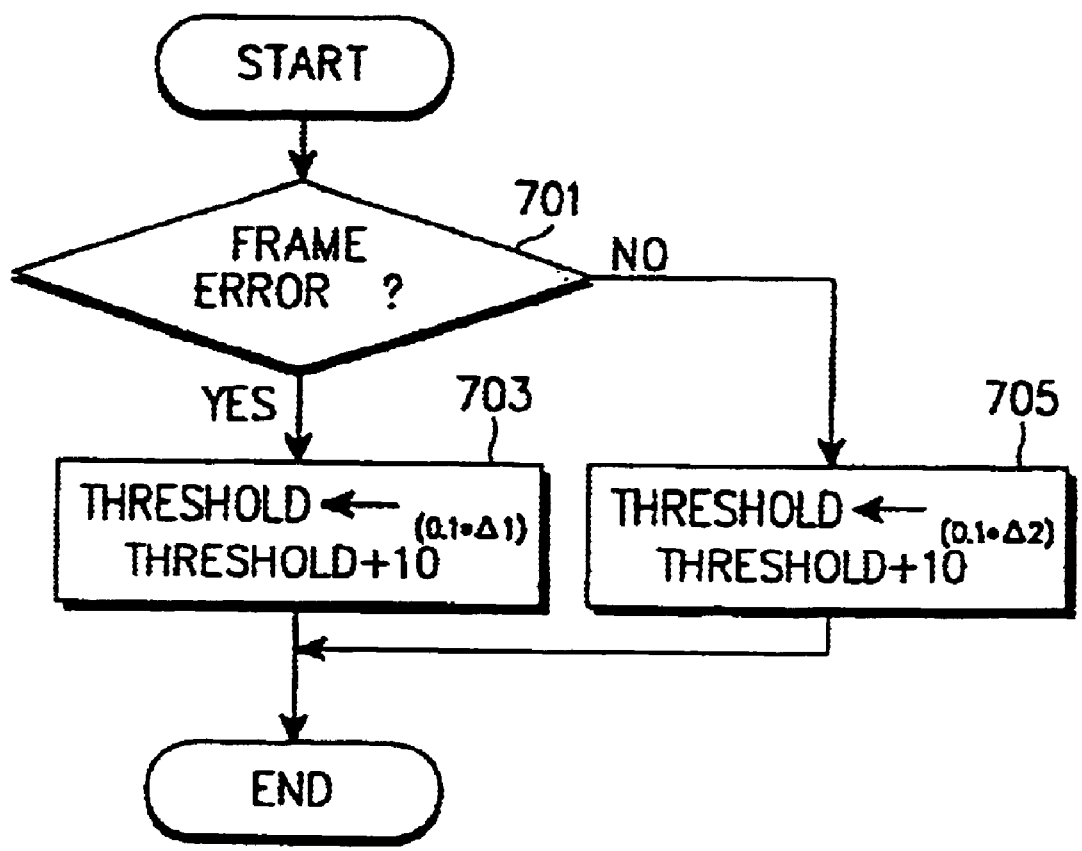
FIG. 7 is a flowchart illustrating an outer-loop power control method.
Figure 18:
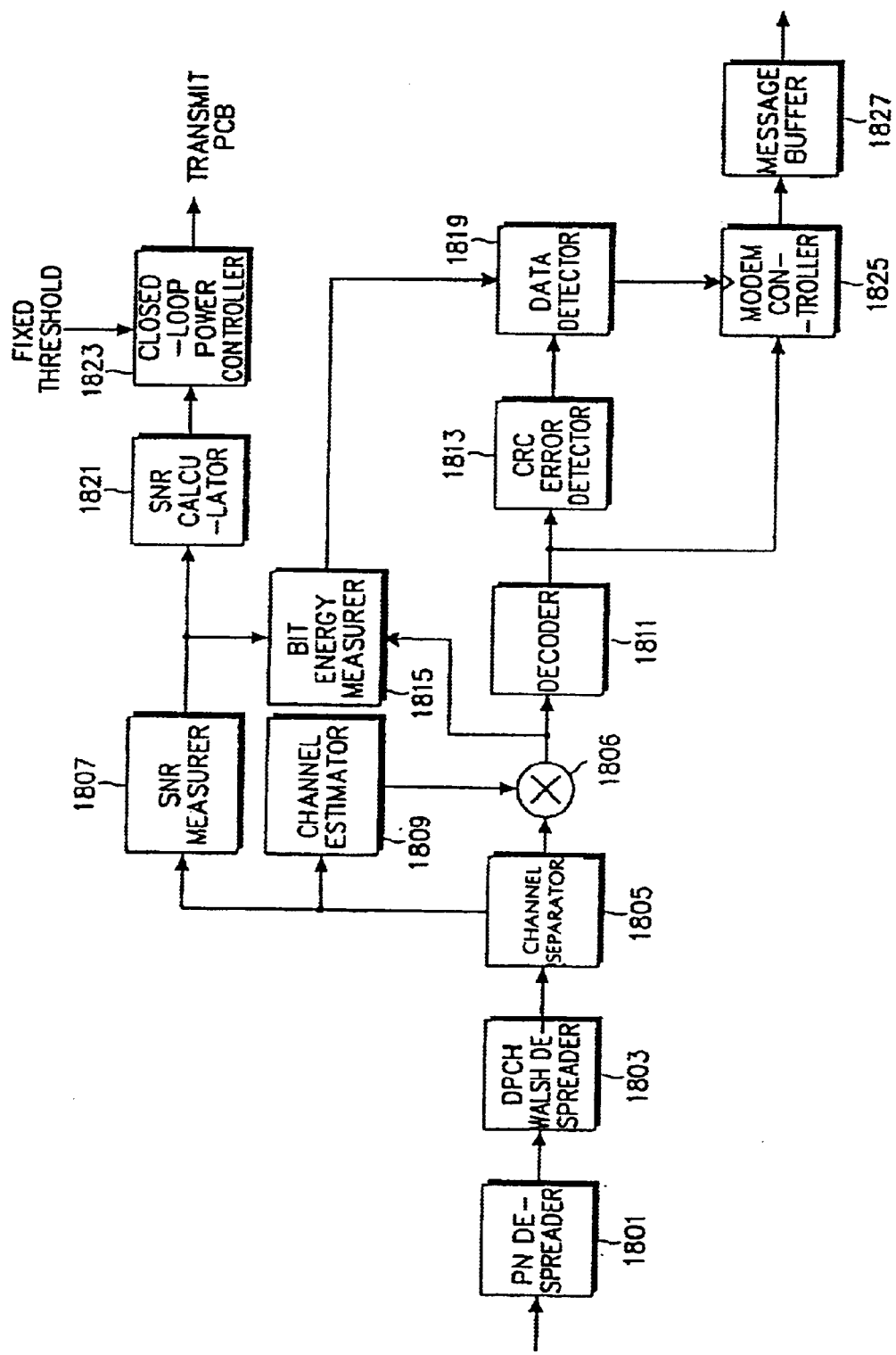
FIG. 18 is a block diagram of a conventional asynchronous DPCH receiver in a DTX mode.
Figure 19:
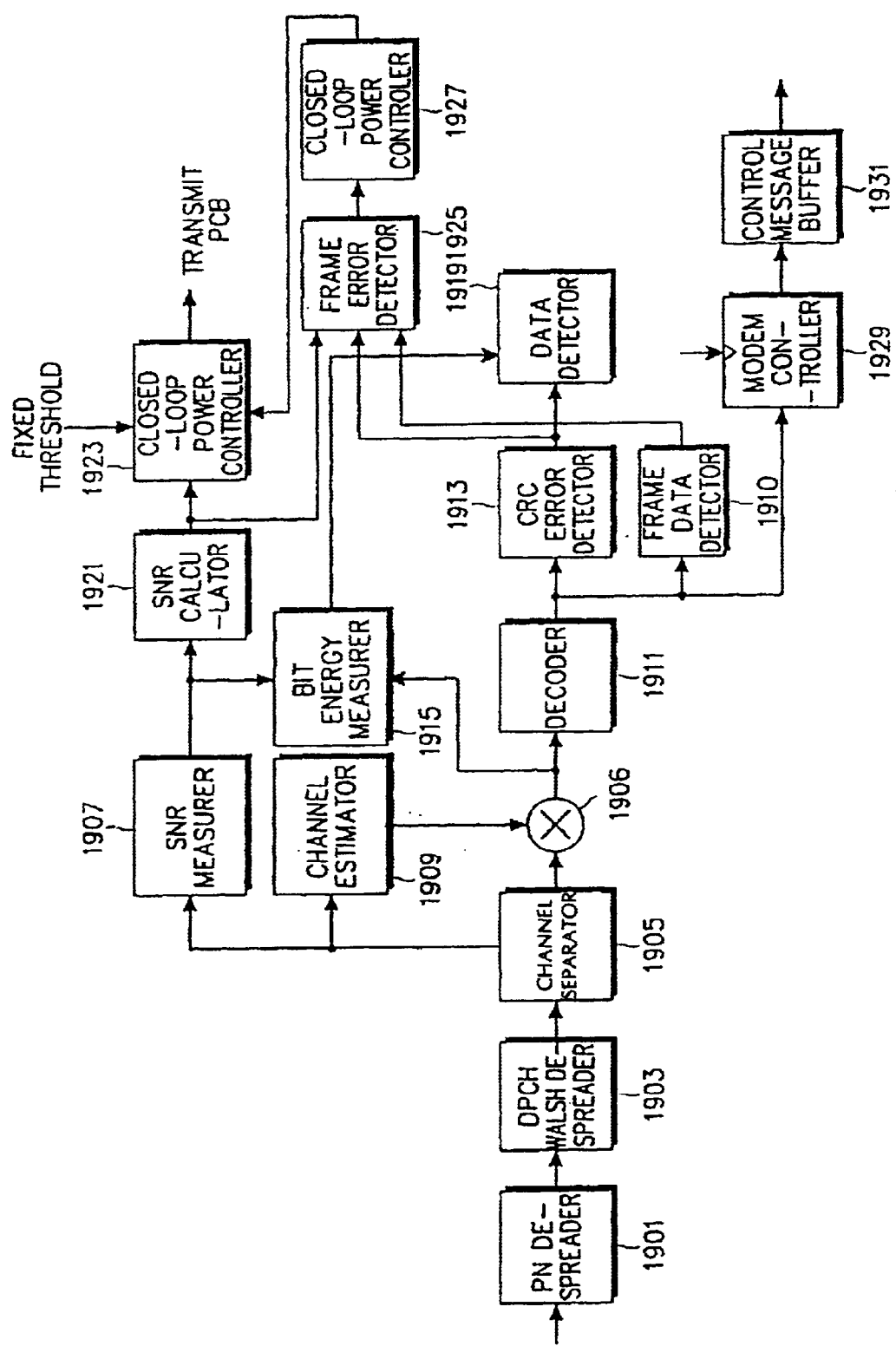
FIG. 19 is a block diagram of an embodiment of an asynchronous DPCH receiver for outer-loop power control in a DTX mode according to the present invention.

FIG. 19 is a block diagram of an embodiment of a receiver for performing a continuous outer-loop power control with respect to a DPCH transmitted in a DTX mode in an asynchronous IMT-2000 system according to the present invention. The receiver is different from that shown in FIG. 18 in that a frame error detector 1925 and an outer-loop power controller 1927 are further provided. The frame error detector 1925 outputs frame error information to the outer-loop power controller 1927, for the input of an SNR, a CRC error check result, and information about the presence or absence of data (DPDCH). The operation of the frame error detector 1925 is shown in FIGS. 10 and 11, and the operation of the outer-loop power controller 1925 is shown in FIG. 7.

As described above, the present invention is advantageous in that since an outer-loop power control is possible even for a non-data transmission period-in a DTX mode, an accurate threshold for outer-loop power control can be obtained even in the non-frame data transmission period.

Another advantage of the present invention is that transmission power can be saved and frame errors can be decreased due to the accurate threshold.

While the invention has been shown and described with reference to certain preferred embodiments thereof, it will be understood by those skilled in the art that many changes in form and details may be made therein without departing from the spirit and scope of the invention as defined by the appended claims.

What is claimed is:

1. An outer-loop power control method for a dedicated channel which transmits frame data discontinuously, the method comprising the steps of:

measuring the signal-to-noise ratio (SNR) of power control bits (PCBs) received at a mobile station from a base station for a non-frame data transmission period;

determining whether a received frame has errors based on the measured SNR; and increasing a closed-loop power control threshold if a frame error exists and decreasing the threshold if no frame error exists.

2. The method recited in claim 1, wherein the SNR measuring step comprises the steps of:

calculating a SNR of the PCBs; and obtaining a final SNR by adding an error-compensating offset value to the SNR.

3. The method recited in claim 2, wherein the received frame error determination step comprises the steps of:

detecting a frame error rate (FER) corresponding to the SNR of the PCBs from a look-up table including corresponding FERs for measured SNRs;

generating a random coefficient; and determining whether frame errors have occurred based on a comparison between the random coefficient and the FER.

4. The method recited in claim 3, wherein the random coefficient is between 0 and 1.

5. The method recited in claim 1, wherein it is determined whether frame errors have occurred based on comparing the measured SNR with a preset threshold for a target FER in the frame error determination step.

6. The method recited in claim 1, wherein the frame error determination step comprises the steps of:

comparing the measured SNR with a first threshold;

increasing a count number of measured SNRs which are smaller than the first threshold when the measured SNR is smaller than the first threshold;

determining whether all SNRs are measured for one frame; and determining whether frame errors have occurred based on a comparison between the count value and a second threshold.

7. An outer-loop power control method for a dedicated channel which transmits frame data discontinuously, the method comprising the steps of:

measuring the SNR of a pilot channel signal received at a base station from a mobile station for a non-frame data transmission period;

determining whether a received frame has errors based on the measured SNR; and increasing a closed-loop power control threshold if a frame error exists and decreasing the threshold if no frame error exists.

8. The method recited in claim 7, wherein the SNR measuring step comprises the steps of:

calculating a SNR of the pilot channel signal; and obtaining a final SNR by adding an error-compensating offset value to the SNR.

9. The method recited in claim 7, wherein the frame error determination step comprises the steps of:

detecting an FER corresponding to the SNR of the pilot channel signal from a look-up table including corresponding FERs for measured SNRs;

generating a random coefficient; and determining whether frame errors have occurred based on a comparison between the random coefficient and the FER.

10. The method recited in claim 9, wherein the random coefficient is between 0 and 1.

11. The method recited in claim 7, wherein it is determined whether frame errors have occurred based on comparing the measured SNR with a preset threshold for a target FER in the frame error determination step.

12. The method recited in claim 7, wherein the frame error determination step comprises the steps of:

comparing the measured SNR with a first threshold;

increasing a count number of measured SNRs which are smaller than the first threshold when the measured SNR is smaller than the first threshold;

determining whether all SNRs are measured for one frame; and determining whether frame errors have occurred based on a comparison between the count value and a second threshold.

13. An outer-loop power control device for a dedicated channel which transmits frame data discontinuously, comprising:

A an SNR measurer for measuring a SNR of PCBs received at a mobile station from a base station for a non-frame data transmission period;

a frame error detector for determining whether the received frame has errors based on the measured SNR and outputting a frame error indicator according to the determination; and an outer-loop power controller for controlling a closed-loop power control threshold according to the frame error indicator.

14. The device recited in claim 13, wherein the frame error detector comprises:

a look-up table storage for storing a look-up table having corresponding FERs for SNRs; and a frame error estimator for receiving the measured SNR, detecting a corresponding FER from the look-up table, and determining whether frame errors exist according to the corresponding FER.

15. The device recited in claim 14, further comprising a random number generator for generating a random number and outputting the random number to the frame error estimator.

16. The device recited in claim 15, wherein the frame error estimator receives the random number, compares the random number with the corresponding FER, and determines that frame errors have occurred when the random number is smaller than the corresponding FER.

17. The device recited in claim 13, further comprising a switch for selecting one of the frame error indicator or a CRC error check result received from a CRC error detector, said selection depending on whether a frame error,is present, and outputting the selected one to the outer-loop power controller.

18. The device of claim 13, wherein the frame error detector determines whether frame errors have occurred by comparing the measured SNR with a predetermined threshold.

19. The device of claim 13, wherein the frame error detector counts measured SNRs smaller than a first threshold in frame units, and determines that frame errors have occurred if the count value is larger than a second threshold.

20. An outer-loop power control device for a dedicated channel which transmits frame data discontinuously, comprising:

an SNR measurer for measuring the SNR of a pilot channel signal received at a mobile station from a base station for a non-frame data transmission period;

a frame error detector for determining whether the received frame has errors based on the measured SNR and outputting a frame error indicator according to the determination; and an outer-loop power controller for controlling a closed-loop power control threshold according to the frame error indicator.

21. The device recited in claim 20, wherein the frame error detector comprises:

a look-up table storage for storing a look-up table having corresponding FERs for SNRs; and a frame error estimator for receiving the measured SNR, detecting a corresponding FER from the look-up table, and determining whether frame errors exist according to the FER.

22. The device recited in claim 21, further comprising a random number generator for generating a random number and outputting the random number to the frame error estimator.

23. The device recited in claim 22, wherein the frame error estimator receives the random number, compares the random number with the FER, and determines that frame errors have occurred when the random number is smaller than the FER.

24. The device recited in claim 20, further comprising a switch for selecting one of the frame error indicator and a CRC error check result received from the CRC error detector, said selection depending on whether a frame error is present, and outputting the selected one to the outer-loop power controller.

25. An outer-loop power control method for a dedicated control channel (DCCH) which transmits frame data discontinuously, the method comprising the steps of:
measuring the signal-to-noise ratio (SNR) of power control bits (PCBs) received at a mobile station from a base station for a non-frame data transmission period;
determining whether a received frame has errors based on the measured SNR; and
controlling a closed-loop power control threshold based upon the determination.

26. The method as recited in claim 25, wherein the closed-loop power control is increased when a frame error exists.

27. The method as recited in claim 25, wherein the closed-loop power control is decreased when no frame error exists.

* * * * *